(12) United States Patent
Kim

(10) Patent No.: US 12,235,778 B2
(45) Date of Patent: Feb. 25, 2025

(54) MEMORY SYSTEM OF ARTIFICIAL NEURAL NETWORK BASED ON ARTIFICIAL NEURAL NETWORK DATA LOCALITY

(71) Applicant: DEEPX CO., LTD., Seongnam-si (KR)

(72) Inventor: Lok Won Kim, Seongnam-si (KR)

(73) Assignee: DEEPX CO., LTD., Seongnam-si (KR)

( * ) Notice: Subject to any disclaimer, the term of this patent is extended or adjusted under 35 U.S.C. 154(b) by 0 days.

(21) Appl. No.: 17/430,323

(22) PCT Filed: Dec. 3, 2020

(86) PCT No.: PCT/KR2020/017576
§ 371 (c)(1),
(2) Date: Aug. 12, 2021

(87) PCT Pub. No.: WO2022/092416
PCT Pub. Date: May 5, 2022

(65) Prior Publication Data
US 2023/0297519 A1    Sep. 21, 2023

(30) Foreign Application Priority Data
Nov. 2, 2020    (KR) .................. 10-2020-0144308

(51) Int. Cl.
*G06F 13/16* (2006.01)
*G06F 13/18* (2006.01)

(52) U.S. Cl.
CPC .......... *G06F 13/1668* (2013.01); *G06F 13/18* (2013.01)

(58) Field of Classification Search
CPC .. G06F 12/02; G06F 12/0804; G06F 12/0811; G06F 13/16; G06F 13/1668; G06F 13/18
See application file for complete search history.

(56) References Cited

U.S. PATENT DOCUMENTS

| | | | |
|---|---|---|---|
| 9,836,691 B1 | 12/2017 | Narayanaswami et al. |
| 10,360,971 B1 | 7/2019 | Hokenmaier et al. |
| 10,437,718 B1 | 10/2019 | Anghel et al. |

(Continued)

FOREIGN PATENT DOCUMENTS

| CN | 107491811 A | 12/2017 |
|---|---|---|
| CN | 107590535 A | 1/2018 |

(Continued)

OTHER PUBLICATIONS

"A neural network memory prefetcher using semantic locality", Jul. 26, 2018.

(Continued)

*Primary Examiner* — Yong J Choe
(74) *Attorney, Agent, or Firm* — INVENSTONE PATENT, LLC

(57) ABSTRACT

An artificial neural network memory system includes at least one processor configured to generate a data access request corresponding to an artificial neural network operation; and at least one artificial neural network memory controller configured to sequentially record the data access request to generate an artificial neural network data locality pattern of the artificial neural network operation and generate an advance data access request which predicts a next data access request of the data access request generated by the at least one processor based on the artificial neural network data locality pattern.

25 Claims, 11 Drawing Sheets

(56) References Cited

U.S. PATENT DOCUMENTS

| | | |
|---|---|---|
| 2002/0003748 A1 | 1/2002 | Fujita et al. |
| 2003/0031073 A1 | 2/2003 | Yahata et al. |
| 2007/0106860 A1 | 5/2007 | Foster, Sr. et al. |
| 2009/0041385 A1 | 2/2009 | Watanabe |
| 2011/0296097 A1 | 12/2011 | Elnozahy et al. |
| 2014/0063950 A1 | 3/2014 | Baek et al. |
| 2015/0199394 A1 | 7/2015 | Fudono et al. |
| 2016/0163379 A1 | 6/2016 | Roine et al. |
| 2018/0157967 A1 | 6/2018 | Henry et al. |
| 2018/0190339 A1 | 7/2018 | Akin et al. |
| 2019/0013062 A1 | 1/2019 | Atallah et al. |
| 2019/0043832 A1 | 2/2019 | Teig et al. |
| 2019/0057300 A1 | 2/2019 | Mathuriya et al. |
| 2019/0138892 A1 | 5/2019 | Kim et al. |
| 2019/0187963 A1 | 6/2019 | Bokhari et al. |
| 2019/0205746 A1 | 7/2019 | Nurvitadhi et al. |
| 2019/0236445 A1 | 8/2019 | Das et al. |
| 2019/0243771 A1 | 8/2019 | Mittal et al. |
| 2019/0332525 A1 | 10/2019 | Anghel et al. |
| 2020/0012924 A1 | 1/2020 | Ma et al. |
| 2020/0034697 A1 | 1/2020 | Choi et al. |
| 2020/0104691 A1 | 4/2020 | Bai et al. |
| 2020/0117989 A1 | 4/2020 | Huang et al. |
| 2020/0117990 A1 | 4/2020 | Rhu et al. |
| 2020/0151088 A1 | 5/2020 | Gu et al. |
| 2020/0387422 A1 | 12/2020 | Bell et al. |
| 2020/0409760 A1 | 12/2020 | Nakashima et al. |
| 2021/0150352 A1 | 5/2021 | Kim |
| 2021/0263865 A1 | 8/2021 | Lee et al. |
| 2023/0306258 A1 | 9/2023 | Assael et al. |
| 2024/0147264 A1 | 5/2024 | Yerramalli et al. |

FOREIGN PATENT DOCUMENTS

| | | |
|---|---|---|
| CN | 108108810 A | 6/2018 |
| CN | 108133269 A | 6/2018 |
| CN | 110462640 A | 11/2019 |
| CN | 110462642 A | 11/2019 |
| CN | 110520857 A | 11/2019 |
| CN | 110782027 A | 2/2020 |
| CN | 111199278 A | 5/2020 |
| CN | 111465943 A | 7/2020 |
| KR | 10-2003-0010469 A | 2/2003 |
| KR | 10-2006-0007115 A | 1/2006 |
| KR | 10-2007-0114851 A | 12/2007 |
| KR | 10-2014-0036620 A | 3/2014 |
| KR | 20140088725 A | 7/2014 |
| KR | 10-2017-0111354 A | 10/2017 |
| KR | 10-2018-0062914 A | 6/2018 |
| KR | 20190018888 A | 2/2019 |
| KR | 10-2023487 B1 | 9/2019 |
| KR | 10-2020-0040560 A | 4/2020 |
| KR | 10-2020-0108359 A | 9/2020 |
| KR | 10-2020-0108363 A | 9/2020 |

OTHER PUBLICATIONS

"Memory Forwarding : Enabling Aggressive Layout Optimizations by Guaranteeing the Safety of Data Relocation", 1999 IEEE C. Luk.

"A Framework for FPGA-Based Acceleration of Neural Network Inference with Limited Numerical Precision via High-Level Synthesis with Streaming Functionality", L. R. Long, 2016.

"History-Based memory mode prediction for improving memory performance", S. Park , Jun. 20, 2003.

"FPGA Acceleration of Recurrent Neural Network based Language Model", S. Li, Jul. 16, 2015.

A neural network memory prefetcher using semantic locality, arXiv: 1804.00478v2 [cs.DC] Jul. 26, 2018.

A Multi-Neural Network Acceleration Architecture, ISCA, Sep. 23, 2020.

Korean Office Action dated Oct. 24, 2023 issued on Application No. 10-2021-7024935.

Korean Office Action dated Nov. 21, 2023 issued on Application No. 10-2021-0142774.

Korean Office Action dated Nov. 21, 2023 issued on Application No. 10-2021-0142773.

A U.S. Office Action issued on May 11, 2023 in connection with the cross-cited U.S. Appl. No. 17/514,028 which corresponds to the above-referenced U.S. application.

Chinese Office Action dated Nov. 5, 2024 issued on Application No. 202111289109.8.

U.S. Office Action dated Dec. 16, 2024 issued on U.S. Appl. No. 17/512,568.

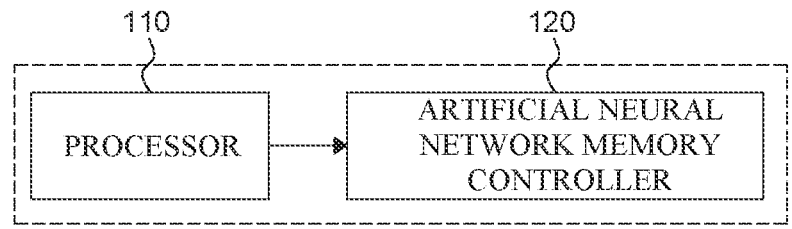
FIG. 1A
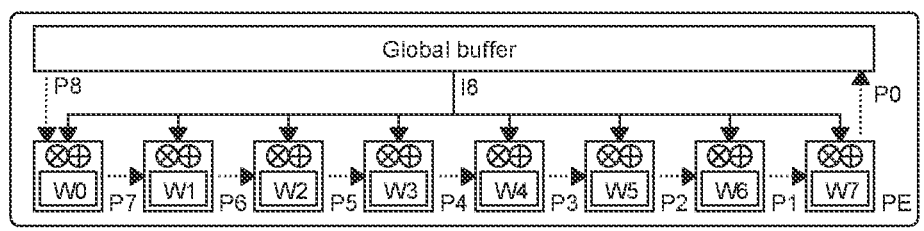
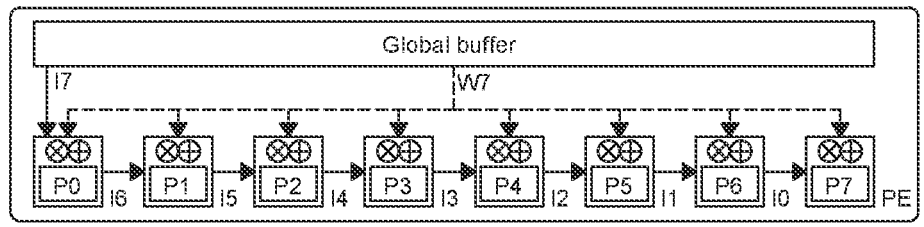
FIG. 1B

| DATA ACCESS REQUEST RECORDING ORDER | Memory Address | | Mode | PATTERN MATCHING | TOKEN |
|---|---|---|---|---|---|
| | Start | End | | | |
| #1 | 0 | 0x1000000 | READ | NO | 1 |
| #2 | 0x1100000 | 0x1110000 | READ | NO | 2 |
| #3 | 0x2000000 | 0x2100000 | WRITE | NO | 3 |
| #4 | 0x2000000 | 0x2100000 | READ | NO | 4 |
| #5 | 0x2110000 | 0x2300000 | READ | NO | 5 |
| #6 | 0x2400000 | 0x2500000 | WRITE | NO | 6 |
| #7 | 0x2400000 | 0x2500000 | READ | NO | 7 |
| #8 | 0x3000000 | 0x3100000 | READ | NO | 8 |
| #9 | 0x3110000 | 0x3121000 | WRITE | NO | 9 |
| #10 | 0 | 0x1000000 | READ | YES | 1 |
| #11 | 0x1100000 | 0x1110000 | READ | YES | 2 |
| #12 | 0x2000000 | 0x2100000 | WRITE | YES | 3 |
| #13 | 0x2000000 | 0x2100000 | READ | YES | 4 |
| #14 | 0x2110000 | 0x2300000 | READ | YES | 5 |
| #15 | 0x2400000 | 0x2500000 | WRITE | YES | 6 |
| #16 | 0x2400000 | 0x2500000 | READ | YES | 7 |
| #17 | 0x3000000 | 0x3100000 | READ | YES | 8 |
| #18 | 0x3110000 | 0x3121000 | WRITE | YES | 9 |

| DATA ACCESS REQUEST | TOKEN | IDENTIFICATION INFORMATION ||
|---|---|---|---|
| | | MEMORY ADDRESS VALUE | OPERATION MODE |
| #1 | [1] | FIRST ADDRESS | READ |
| #2 | [2] | SECOND ADDRESS | READ |
| #3 | [3] | THIRD ADDRESS | WRITE |
| #4 | [4] | THIRD ADDRESS | READ |
| #5 | [5] | FOURTH ADDRESS | READ |
| #6 | [6] | FIFTH ADDRESS | WRITE |
| #7 | [7] | FIFTH ADDRESS | READ |
| #8 | [8] | SIXTH ADDRESS | READ |
| #9 | [9] | SEVENTH ADDRESS | WRITE |

| DATA ACCESS REQUEST TOKEN | ADVANCE DATA ACCESS REQUEST TOKEN | NEXT DATA ACCESS REQUEST TOKEN | PATTERN MATCHING |
|---|---|---|---|
| [1] | [1] | [1] | YES |
| [2] | [2] | [2] | YES |
| [3] | [3] | [3] | YES |
| [4] | [4] | [4] | YES |
| [5] | [5] | [5] | YES |
| [6] | [6] | [6] | YES |
| [7] | [7] | [7] | YES |
| [8] | [8] | [8] | YES |
| [9] | [9] | [9] | YES |

FIG. 6

| [1bit] ARTIFICIAL NEURAL NETWORK OPERATION | [1bit] OPERATION TYPE | | [2bit] OPERATION MODE | | [3bit] DOMAIN | | [5bit] QUANTIZATION | |
|---|---|---|---|---|---|---|---|---|
| [0] TRUE | [0] | LEARNING | [00] | READ | [000] | OTHER | [00000] | Default |
| [1] FALSE | [1] | INFERENCE | [01] | WRITE | [001] | INFERENCE DATA | [00001] | 1 bit width |
| | | | [10] | OVER WRITE | [010] | FEATURE MAP | [00010] | 2 bit width |
| | | | [11] | PROTECT(Reuse) | [011] | WEIGHT | [00011] | 3 bit width |
| | | | | | [100] | LEARNING DATA SET | : | : |
| | | | | | [101] | EVALUATION DATA SET | [11111] | 32 bit width |

FIG. 12

MEMORY SYSTEM OF ARTIFICIAL NEURAL NETWORK BASED ON ARTIFICIAL NEURAL NETWORK DATA LOCALITY

CROSS-REFERENCE TO RELATED APPLICATIONS

This application is a national stage of International Application No. PCT/KR2020/017576, filed on Dec. 3, 2020, which claims the benefit of priority to Korean Application No. 10-2020-0144308, filed on Nov. 2, 2020 in the Korean Intellectual Property Office, the disclosures of which are incorporated herein by reference.

BACKGROUND OF THE DISCLOSURE

Technical Field

The present disclosure relates to an artificial neural network memory system based on a data locality of an artificial neural network, and more particularly, to an artificial neural network memory system in which a memory effectively supplies data required for a processor, based on an artificial neural network data locality of an artificial neural network model which is processed in the unit of the data access request, to improve an operation speed of an artificial neural network.

Background Art

As an artificial intelligence inference ability is developed, various inference services such as sound recognition, voice recognition, image recognition, object detection, driver drowsiness detection, dangerous moment detection, and gesture detection are mounted in various electronic devices such as artificial intelligence speakers, smart phones, smart refrigerators, VR devices, AR devices, artificial intelligence CCTVs, artificial intelligence robot cleaners, tablets, notebook computers, autonomous vehicles, bipedal robots, quadrupedal robots, and industrial robots.

Recently, as the deep learning technique is developed, a performance of an artificial neural network inference service by big-data-based learning is developed. The learning and inference services of the artificial neural network repeatedly train the artificial neural network with a huge amount of learning data and infer various and complex data by means of the trained artificial neural network model. Accordingly, various services are provided to the above-mentioned electronic devices by utilizing the artificial neural network technique.

However, a function and an accuracy required for the inference service which utilizes the artificial neural network are gradually being increased. Accordingly, a size of the artificial neural network model, a computational amount, and a size of learning data are exponentially increased. A performance required for the processor and the memory, which are capable of handling the inference operation of the artificial neural network model, is gradually increased. Also, an artificial neural network inference service is actively provided to a cloud computing-based server which easily handles the big data.

In the meantime, edge computing which utilizes the artificial neural network model technique is actively being studied. The edge computing refers to an edge or a peripheral portion where the computing is performed. The edge computing refers to a terminal which directly produces data or various electronic devices located to be adjacent to the terminal. The edge computing is also referred to as an edge device. The edge device may be utilized to immediately and reliably perform necessary tasks such as autonomous drones, autonomous robots, or autonomous vehicles which need to process a huge amount of data within $\frac{1}{100}$ of a second. Accordingly, fields to which the edge device is applicable are rapidly increasing.

SUMMARY OF THE DISCLOSURE

The inventor of the present disclosure has recognized that an operation of the artificial neural network model of the related art had problems, such as high power consumption, heating, and a bottleneck phenomenon of a processor operation due to a relatively low memory bandwidth and a memory latency. Accordingly, the inventor has recognized that there were various difficulties to improve the operation processing performance of the artificial neural network model and has also recognized that an artificial neural network memory system which is capable of improving the problems needed to be developed.

Therefore, the inventor of the present disclosure studied an artificial neural network memory system which is applicable to a server system and/or edge computing. Moreover, the inventor of the present disclosure also studied a neural network processing unit (NPU) which is a processor of an artificial neural network memory system optimized for processing the artificial neural network model.

First, the inventor of the present disclosure has recognized that in order to improve the computational processing speed of the artificial neural network, the key point was to effectively control the memory during the computation of the artificial neural network model. The inventor of the present disclosure has recognized that when the artificial neural network model is trained or inferred, if the memory is not appropriately controlled, necessary data is not prepared in advance so that reduction in the memory effective bandwidth and/or delay of the data supply of the memory may frequently occur. Further, the inventor of the present disclosure has recognized that in this case, a starvation or idle state in which the processor is not supplied with data to be processed is caused so that an actual operation cannot be performed, which results in the degradation of the operation performance.

Second, the inventor of the present disclosure has recognized a limitation of the operation processing method of the artificial neural network model at an algorithm level of the related art. For example, a prefetch algorithm of the related art is a technique which analyzes the artificial neural network models in a conceptual layer unit so that the processor reads data from the memory in each layer unit. However, the prefetch algorithm cannot recognize an artificial neural network data locality in the word unit or a memory access request unit of the artificial neural network model existing at a processor-memory level, that is, a hardware level. The inventor of the present disclosure has recognized that it is difficult to optimize the data transmitting/receiving operation at the processor-memory level only by the prefetch technique.

Third, the inventor of the present disclosure has recognized an "artificial neural network data locality" which is a unique characteristic of the artificial neural network model. The inventor of the present disclosure has recognized that there is an artificial neural network data locality in the word unit or the memory access request unit at the processor-memory level and the effective memory bandwidth is maximized and the latency of the data supplying to the processor is minimized by utilizing the artificial neural network data locality to improve the artificial neural network learning/inference operation processing performance of the processor.

Specifically, the "artificial neural network data locality" of the artificial neural network model recognized by the inventor of the present disclosure refers to sequence information of the word unit of data required to computationally process the artificial neural network by a processor which is performed in accordance with the structure of the artificial neural network model and the operation algorithm when the processor processes a specific artificial neural network model. Moreover, the inventor of the present disclosure has recognized that in the operation processing sequence of the artificial neural network model, an artificial neural network data locality is maintained for the operation of the iterative learning and/or inference for the artificial neural network model given to the processor. Accordingly, the inventor of the present disclosure has recognized that when the artificial neural network data locality is maintained, the processing sequence of the data required for the artificial neural network operation processed by the processor is maintained in the word unit and the information is provided or analyzed to be utilized for the artificial neural network operation. In other words, the word unit of the processor may refer to an element unit which is a basic unit to be processed by the processor. For example, when a neural network processing unit processes the multiplication of N-bit input data and M-bit kernel weight, an input data word unit of the processor may be N bits and a word unit of the weight data may be M bits. Further, the inventor of the present disclosure has recognized that the word unit of the processor may be set to be different depending on a layer, a feature map, a kernel, an activation function, and the like of the artificial neural network model, respectively. Accordingly, the inventor of the present disclosure also has recognized that a precise memory control technique is necessary for the operation in the word unit.

The inventor of the present disclosure paid attention that when the artificial neural network model is compiled by a compiler to be executed in a specific processor, the artificial neural network data locality is constructed. Further, the inventor has recognized that the artificial neural network data locality may be constructed in accordance with an operation characteristic of the algorithms applied to the compiler and the artificial neural network model, and the processor. In addition, the inventor of the present disclosure has recognized that even in the same artificial neural network model, the artificial neural network data locality of the artificial neural network model to be processed may be constructed in various forms depending on a computing method of the artificial neural network model of the processor, for example, feature map tiling, the stationary technique of a processing element, the number of processing elements of a processor, a feature map in the processor, a cache memory capacity such as a weight, a memory layered structure in the processor, an algorithm characteristic of a compiler which determines a sequence of a computational operation of the processor to compute the artificial neural network model. This is because even though the same artificial neural network model is computed, the processor may determine the sequence of data necessary at every moment in the clock unit to be different due to the above-mentioned factors. That is, the inventor of the present disclosure has recognized that the sequence of the data necessary for the computation of the artificial neural network model is conceptually the computational sequence of the layers of the artificial neural network, unit convolution and/or matrix multiplication. Moreover, the inventor of the present disclosure has recognized that in the sequence of data required for physical computation, the artificial neural network data locality of the artificial neural network model is constructed in the word unit at a processor-memory level, that is, a hardware level. Further, the inventor of the present disclosure has recognized that the artificial neural network data locality depends on a processor and a compiler used for the processor.

Fourth, the inventor of the present disclosure has recognized that when an artificial neural network memory system constructed to be supplied with the artificial neural network data locality information to utilize the artificial neural network data locality is provided, the processing performance of the artificial neural network model may be maximized at the processor-memory level.

The inventor of the present disclosure has recognized that when the artificial neural network memory system precisely figures out the word unit of the artificial neural network data locality of the artificial neural network model, the processor also finds operation processing sequence information of the word unit which is a minimum unit by which the processor processes the artificial neural network model. That is, the inventor of the present disclosure has recognized that when the artificial neural network memory system which utilizes the artificial neural network data locality is provided, the artificial neural network memory system may precisely predict whether to read specific data from the memory at a specific timing to provide the specific data to the processor or whether the specific data is to be computed by the processor to store the specific data in the memory at a specific timing, in the word unit. Accordingly, the inventor of the present disclosure has recognized that the artificial neural network system is provided to prepare data to be requested by the processor in the word unit in advance.

In other words, the inventor of the present disclosure has recognized that if the artificial neural network memory system knows the artificial neural network data locality, when the processor calculates a convolution of the specific input data and a specific kernel using a technique such as feature map tiling, the operation processing sequence of the convolution which is processed while the kernel moves in a specific direction is also known in the word unit.

That is, it was recognized that the artificial neural network memory system predicts which data will be necessary for the processor by utilizing the artificial neural network data locality, so that a memory read/write operation to be requested by the processor is predicted and data to be processed by the processor is prepared in advance to minimize or eliminate the memory effective bandwidth increase and/or the data supply latency of the memory. Further, the inventor has recognized that when the artificial neural network memory system supplies data to be processed by the processor at a necessary timing, the starvation or idle state of the processor may be minimized. Accordingly, the inventor of the present disclosure has recognized that the operation processing performance may be improved and the power consumption may be reduced by the artificial neural network memory system.

Fifth, the inventor of the present disclosure has recognized that even though an artificial neural network memory controller is not provided with artificial neural network data locality information, after disposing the artificial neural network memory controller in a communication channel between a processor which is processing the artificial neural network model and the memory, when the processor processes the operation of the specific artificial neural network model, a data access request to the memory is analyzed to infer the artificial neural network data locality of the artificial neural network model which is being processed by the processor in the data access request unit between the processor and the memory. That is, the inventor of the present disclosure has recognized that each artificial neural network model has a unique artificial neural network data locality, so that the processor generates the data access request in a specific sequence according to the artificial neural network data locality at the processor-memory level. Further, the inventor of the present disclosure has recognized that the access que of data stored in the memory for data request between the processor and the memory based on the fact that the artificial neural network data locality is maintained while the processor iteratively processes the learning/inference operation of the artificial neural network model.

Therefore, the inventor of the present disclosure disposed the artificial neural network memory controller in a communication channel of the processor which was operating the artificial neural network model and the memory. Further, the inventor observed the data access request between the processor and the memory for one or more learning and inference operations to recognize that the artificial neural network memory controller may infer the artificial neural network data locality in the data access request unit. Accordingly, the inventor of the present disclosure has recognized that even though the artificial neural network data locality information is not provided, the artificial neural network data locality may be inferred by the artificial neural network memory controller.

Therefore, the inventor of the present disclosure has recognized that the memory read/write operation to be requested by the processor based on the artificial neural network data locality which is reconstructed in the data access request unit can be predicted and that the memory effective bandwidth increase and/or the memory data supply latency may be minimized or substantially eliminated by preparing data to be processed by the processor in advance. Further, the inventor of the present disclosure has recognized that when the artificial neural network memory system supplies data to be processed by the processor at a necessary timing, the starvation or idle state occurrence rate of the processor may be minimized.

Accordingly, an object to be achieved by the present disclosure is to provide an artificial neural network memory system which optimizes an artificial neural network operation of a processor by utilizing an artificial neural network data locality of an artificial neural network model which operates at a processor-memory level.

Therefore, an object to be achieved by the present disclosure is to provide an artificial neural network memory system including an artificial neural network memory controller which detects a data access request generated by a processor to generate a data locality pattern of the artificial neural network model which is being processed by the processor to improve a latency problem of the memory by preparing a data access request to be requested by the processor in advance. However, the present disclosure is not limited thereto, and other objects may be obviously understood by those skilled in the art from the following description.

An artificial neural network memory system according to an exemplary embodiment of the present disclosure is provided. The system may be configured to include at least one processor configured to generate a data access request corresponding to an artificial neural network operation; and at least one artificial neural network memory controller configured to sequentially record the data access request to generate an artificial neural network data locality pattern of the artificial neural network operation and generate an advance data access request which predicts a next data access request of the data access request generated by the at least one processor based on the artificial neural network data locality pattern.

An artificial neural network memory system according to exemplary embodiments of the present disclosure may be configured to include at least one processor configured to process the artificial neural network model and at least one artificial neural network memory controller configured to store artificial neural network data locality information of an artificial neural network model and predict data to be requested by at least one processor based on the artificial neural network data locality information to generate an advance data access request.

The artificial neural network memory system may be configured to further include at least one memory and a system bus configured to control communication of the artificial neural network memory controller, at least one processor, and at least one memory.

According to the exemplary embodiments of the present disclosure, an artificial neural network memory system includes a processor, a memory, and a cache memory and may be configured to generate an advance data access request including data to be requested by the processor based on artificial neural network data locality information and to store data corresponding to the advance data access request from the memory in the cache memory before the request of the processor.

According to the exemplary embodiment of the present disclosure, the artificial neural network memory system may be configured to operate in either one of a first mode configured to operate by receiving the artificial neural network data locality information and a second mode configured to operate by observing data access requests generated by the processor to predict the artificial neural network data locality information.

Here, the artificial neural network data locality may be an artificial neural network data locality which is reconstructed at a processor-memory level.

At least one artificial neural network memory controller may be configured to sequentially further generate an advance data access request based on the artificial neural network data locality pattern.

At least one artificial neural network memory controller may be configured to generate an advance data access request before generating a next data access request.

At least one processor may be configured to transmit a data access request to at least one artificial neural network memory controller.

At least one artificial neural network memory controller may be configured to output an advance data access request in response to a data access request.

The data access request may be configured to further include a memory address.

The data access request may be configured to further include a start address and/or an end address of the memory.

At least one artificial neural network memory controller may be configured to generate a memory access request based on one of the data access request generated by at least one processor and the advance data access request generated by the artificial neural network memory controller.

The data access request may be configured to further include a start address of the memory and a continuous data read (or burst read) trigger.

The data access request may be configured to further include a start address of the memory and information of the number of continuous data.

The data access request and the advance data access may be configured to further include a data access request token of the same matching memory address.

The data access request may be configured to further include identification information to identify whether it is a memory read command or a write command.

The data access request may be configured to further include identification information to identify whether it is a memory overwrite command.

The data access request may be configured to further include identification information to identify whether it is inference data, weight data, or feature map data.

The data access request may be configured to further include identification information to identify whether it is learning data or evaluation data.

The data access request may be configured to further include identification information to identify whether the artificial neural network operation is an operation for learning or an operation for inference.

When at least one processor generates a next data access request, at least one artificial neural network memory controller may be configured to determine whether an advance data access request and a next data access request are the same requests.

When the advance data access request and the next data access request are the same requests, at least one artificial neural network memory controller may be configured to maintain the artificial neural network data locality pattern.

When the advance data access request and the next data access request are different, at least one artificial neural network memory controller may be configured to update the artificial neural network data locality pattern.

The artificial neural network data locality pattern may be configured to further include data in which addresses of the memory of the data access requests are sequentially recorded.

At least one artificial neural network memory controller may be configured to generate the artificial neural network data locality pattern by detecting the repeated pattern of the memory address included in the data access request.

The artificial neural network data locality pattern may be configured by memory addresses having a repeated loop characteristic.

The artificial neural network data locality pattern may be configured to further include identification information for identifying the start and the end of the operation of the artificial neural network model.

At least one processor may be configured to be provided with data corresponding to the data access request from the artificial neural network memory controller.

At least one artificial neural network memory controller may be configured to further include an artificial neural network model which is configured to machine-learn the artificial neural network data locality pattern.

At least one artificial neural network memory controller may be configured to store an updated pattern and a previous pattern of the artificial neural network data locality pattern to determine whether the artificial neural network model is changed.

At least one artificial neural network memory controller may be configured to determine whether the data access requests are requests of one artificial neural network model or are mixtures of the requests of the plurality of artificial neural network models.

When there are a plurality of artificial neural network models, at least one artificial neural network memory controller may be configured to further generate artificial neural network data locality patterns corresponding to the number of artificial neural network models.

At least one artificial neural network memory controller may be configured to individually generate corresponding advance data access requests based on the artificial neural network data locality patterns.

At least one artificial neural network memory controller may be configured to further generate a memory access request corresponding to the data access request.

At least one artificial neural network memory controller may be configured to further generate a memory access request corresponding to the advance data access request.

Each of the data access request, the advance data access request, and the memory access request may be configured to include the corresponding memory address value and operation mode, respectively.

At least one artificial neural network memory controller may be configured to further generate a memory access request including at least a part of the information included in the data access request and the advance data access request.

At least one memory may be configured to communicate with at least one artificial neural network memory controller, and at least one memory may be configured to operate in response to the memory access request output from at least one artificial neural network memory controller.

At least one memory may be configured to store at least one of inference data, weight data, and feature map data.

At least one artificial neural network memory controller may be configured to further include a cache memory configured to store data transmitted from at least one memory in response to the memory access request.

When at least one processor outputs a next data access request, at least one artificial neural network memory controller determines whether the advance data access request and the next data access request are the same requests. If the advance data access request and the next data access request are the same, at least one artificial neural network memory controller provides data stored in the cache memory to at least one processor and if the advance data access request and the next data access request are not the same, at least one artificial neural network memory controller generates a new memory access request based on the next data access request.

At least one artificial neural network memory controller sequentially generates at least one memory access request based on a remaining capacity of the cache memory to minimize the remaining capacity of the cache memory.

At least one artificial neural network memory controller may be configured to measure an effective bandwidth of at least one memory which responds to the memory access request.

At least one artificial neural network memory controller may be configured to be provided with a necessary bandwidth of at least one memory which responds to the memory access request.

At least one artificial neural network memory controller may be configured to measure the number of inferences per second (IPS) of the artificial neural network operation by calculating the number of repeating times of the artificial neural network data locality patterns for a specific time.

At least one artificial neural network memory controller may be configured to calculate a time taken to repeat the artificial neural network data locality pattern one time and a data size to calculate an effective bandwidth required for the artificial neural network operation.

At least one memory may further include a DRAM including a refresh function to update a voltage of a memory cell, and at least one artificial neural network memory controller may be configured to selectively control the refresh of a memory address area of at least one memory corresponding to the memory access request corresponding to the advance data access request.

At least one memory may further include a precharge function to charge a global bit line of the memory with a specific voltage, and at least one artificial neural network memory controller may be configured to selectively provide precharge to a memory address area of at least one memory corresponding to the memory access request corresponding to the advance data access request.

At least one memory may further include a plurality of memories, and at least one artificial neural network memory controller may be configured to measure effective bandwidths of the plurality of memories, respectively.

At least one memory may further include a plurality of memories, and at least one artificial neural network memory controller may be configured to measure latencies of the plurality of memories, respectively.

At least one memory may further include a plurality of memories, and at least one artificial neural network memory controller may be configured to divide and store data to be stored in the plurality of memories based on the effective bandwidth and the latency of each of the plurality of memories.

Data is configured by L bits of bit groups, and a plurality of memories includes a first memory and a second memory. The first memory is configured to divide and store M bits of data from the L bits of bit groups based on a first effective bandwidth or a first latency and the second memory is configured to divide and store N bits of data from the L bits of bit groups based on a second effective bandwidth or a second latency. The sum of M bits and N bits may be configured to be smaller than or equal to the L bits.

The plurality of memories may further include a third memory, and the third memory may be configured to store O bits of data from the L bits of bit groups based on a third effective bandwidth or a third latency. The sum of the M bits, N bits, and O bits may be configured to be equal to the L bits.

At least one artificial neural network memory controller may be configured to further include a cache memory which is configured to merge and store data which is divided to be stored in the plurality of memories.

Data is configured by P data packets, and a plurality of memories includes a first memory and a second memory. The first memory is configured to store R data packets among P data packets based a first effective bandwidth or a first latency, and the second memory is configured to store S data packets among P data packets based a second effective bandwidth or a second latency. The sum of R and S may be configured to be smaller than or equal to P.

The plurality of memories may further include a third memory, and the third memory may be configured to store T data packets from the P data packets based on a third effective bandwidth or a third latency. The sum of R, S, and T may be configured to be equal to P.

At least one memory may further include a plurality of memories, and at least one artificial neural network memory controller may further include a cache memory and may be configured to merge data distributed to be stored in the plurality of memories to store the merged data in the cache memory.

At least one memory may further include a plurality of memories, and at least one artificial neural network memory controller may be configured to store divided information of the data which is divided to be stored in the plurality of memories.

At least one artificial neural network memory controller may be configured to store a part of the data in the cache memory as much as the latency, based on the advance data access request and the latency value of at least one memory.

At least one artificial neural network memory controller may be configured to store a part of the data in the cache memory based on the advance data access request and a required data bandwidth of at least one memory.

When at least one processor generates a next data access request, at least one artificial neural network memory controller provides data stored in cache memory first and controls the remaining data in a read-burst mode, from at least one memory, to reduce the latency of at least one memory.

When at least one processor generates a next data access request based on the advance data access request and the latency value of at least one memory, at least one artificial neural network memory controller starts with a read-burst mode of at least one memory to reduce the latency of at least one memory.

A system bus configured to control communication of the artificial neural network memory controller, at least one processor, and at least one memory may be further included.

At least one artificial neural network memory controller may be configured to have a master authority of the system bus.

At least one artificial neural network memory controller may further include an artificial neural network model. When an advance data access request is generated, the artificial neural network model may be machine-trained to increase the control authority of the system bus to be higher than that of a case that the advance data access requests are not generated.

At least one artificial neural network memory controller may be configured to ensure an effective bandwidth of the system bus until at least one memory completes a memory access request.

At least one artificial neural network memory controller may be configured to calculate a specific bandwidth required for the system bus to process a specific memory access request based on the artificial neural network data locality pattern and at least one artificial neural network memory controller may be configured to control the effective bandwidth of the system bus based on the specific bandwidth.

At least one artificial neural network memory controller may be disposed in the system bus, and the system bus may be configured to dynamically change the bandwidth of the system bus based on the artificial neural network data locality pattern generated in the system bus.

At least one artificial neural network memory controller may operate to preferentially process the artificial neural network operation for the processing time of the memory access request and to process operations other than the artificial neural network operation for the other time.

At least one artificial neural network memory controller and at least one processor may be configured to directly communicate with each other.

The artificial neural network memory controller may be configured to further include a first access que which is an access que dedicated to the artificial neural network operation and a second access que which is an access que other than the artificial neural network operation and the artificial neural network memory controller may be configured to select the access que in accordance with the priority setting to provide data.

At least one artificial neural network memory controller may further include a plurality of layered cache memories, and at least one artificial neural network memory controller may be configured to further include an artificial neural network model which is configured to perform machine-learning of data access requests between layers of the plurality of layered cache memories.

At least one artificial neural network memory controller may be configured to further be provided with at least one of an effective bandwidth, a power consumption, and latency information of each layer of the plurality of layered cache memories.

The at least one artificial neural network memory system includes at least one processor configured to generate a data access request corresponding to the artificial neural network operation; at least one artificial neural network memory controller configured to store an artificial neural network data locality pattern of an artificial neural network operation generated from a compiler and to generate an advance data access request which predicts a next data access request of the data access request generated by at least one processor based on the artificial neural network data locality pattern; and at least one memory configured to communicate with at least one artificial neural network memory controller. At least one memory may be configured to operate in accordance with the memory access request output from at least one artificial neural network memory controller.

At least one artificial neural network memory system may be configured to further include at least one memory and a system bus configured to control communication of the artificial neural network memory controller, at least one processor, and at least one memory.

At least one artificial neural network memory controller may be disposed in the system bus, and at least one artificial neural network memory controller may be configured to increase the control authority of the system bus to be higher than that when there is no memory access request, until at least one memory completes the response for the memory access request.

The at least one artificial neural network memory controller includes one or more artificial neural network memory controllers that are configured to be included in the DRAM.

The at least one artificial neural network memory controller includes one or more artificial neural network memory controllers that are configured to be included in at least one processor.

At least one memory may further include a DRAM or at least one memory may be a DRAM, and at least one artificial neural network memory controller may be configured to readjust an access que of the memory access request.

The artificial neural network memory controller may be configured to generate at least one access que.

At least one memory may include an artificial neural network memory controller, and the artificial neural network memory controller may be configured to separately generate the access que dedicated to the artificial neural network operation.

At least one artificial neural network memory controller may be configured to readjust the access que of the memory access requests.

At least one memory may further include a read-burst function, and at least one artificial neural network memory controller may be configured to set the storage area of at least one memory in consideration of the read-burst function.

At least one memory may further include a read-burst function, and at least one artificial neural network memory controller may be configured to process the write operation in the storage area of at least one memory in consideration of the read-burst function.

At least one processor may include a plurality of processors, and at least one artificial neural network memory controller may be configured to set a priority of a data access request of a processor which processes an artificial neural network operation, among a plurality of processors, to be higher than that of a processor which processes an operation other than the artificial neural network operation.

According to the exemplary embodiments of the present disclosure, in the system which processes the artificial neural network, the delay of the data supply of the memory to the processor may be substantially removed or reduced by the artificial neural network data locality.

According to the exemplary embodiments of the present disclosure, the artificial neural network memory controller may prepare data of the artificial neural network model which is processed at a processor-memory level before being requested by the processor.

According to the exemplary embodiments of the present disclosure, the learning and inference operation processing time of the artificial neural network model which is processed by the processor is shortened to improve the operation processing performance of the processor and to improve the power efficiency for the operation processing at the system level.

The effects according to the present disclosure are not limited to the contents exemplified above, and more various effects are included in the present specification.

BRIEF DESCRIPTION OF THE DRAWINGS

FIG. 1A is a schematic block diagram for explaining a processor and an artificial neural network memory controller of an artificial neural network memory system based on an artificial neural network data locality according to an exemplary embodiment of the present disclosure.

FIG. 1B is a schematic diagram illustrating an example of an exemplary neural network processing unit for explaining reconstruction of an artificial neural network data locality pattern which is applicable to various exemplary embodiments of the present disclosure.

FIG. 2 is a schematic diagram for explaining an artificial neural network data locality pattern according to an exemplary embodiment of the present disclosure.

FIG. 5 is a schematic diagram for explaining a token and identification information corresponding to the artificial neural network data locality pattern of FIG. 4.

FIG. 6 is a schematic diagram for explaining an advance data access request and a next data access request generated based on an artificial neural network data locality pattern by an artificial neural network memory controller according to an exemplary embodiment of the present disclosure.

FIG. 12 is a schematic diagram for explaining exemplary identification information of a data access request.

DETAILED DESCRIPTION OF THE DISCLOSURE

Figure 3:
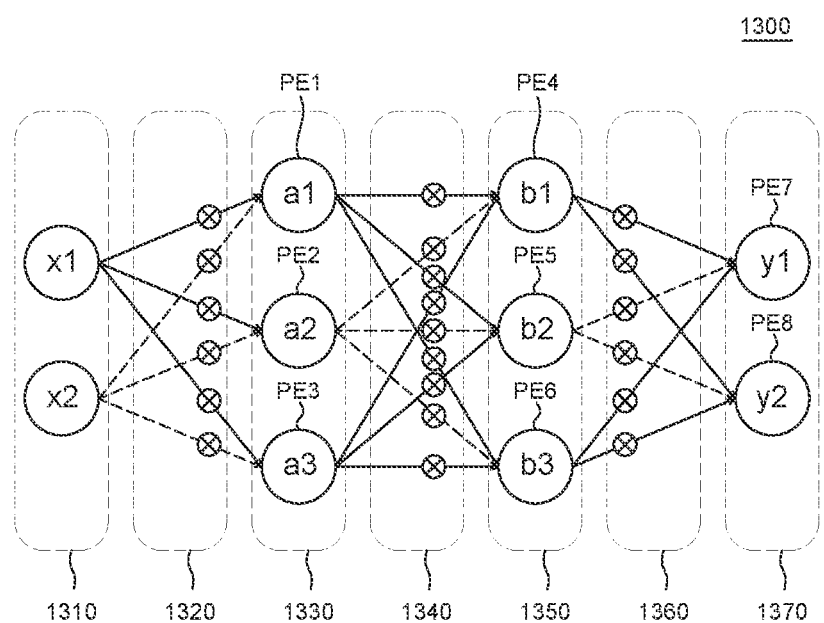
FIG. 3 is a schematic diagram illustrating an exemplary artificial neural network model for explaining an artificial neural network data locality pattern which is applicable to various exemplary embodiments of the present disclosure.

Advantages and characteristics of the present disclosure and a method of achieving the advantages and characteristics will be clear by referring to various exemplary embodiments described below in detail together with the accompanying drawings. However, the present invention is not limited to an exemplary embodiment disclosed herein but will be implemented in various forms. The exemplary embodiments are provided to enable the present invention to be completely disclosed and the scope of the present invention to be easily understood by those skilled in the art. Therefore, the present invention will be defined only by the scope of the appended claims.

Detailed description of the present disclosure may be described with reference to the drawings for the convenience of description with specific exemplary embodiment by which the present disclosure can be carried out as an example. Although components of various exemplary embodiments of the present disclosure are different from each other, manufacturing methods, operating methods, algorithms, shapes, processes, structures, and characteristics described in a specific exemplary embodiment may be combined with or included in other embodiments. Further, it should be understood that a position or a placement of an individual constituent element in each disclosed exemplary embodiment may be changed without departing from the spirit and the scope of the present disclosure. The features of various embodiments of the present disclosure can be partially or entirely bonded to or combined with each other and can be interlocked and operated in technically various ways which are understandable by those skilled in the art, and the embodiments can be carried out independently of or in association with each other.

The shapes, sizes, ratios, angles, numbers, and the like illustrated in the accompanying drawings for describing the exemplary embodiments of the present disclosure are merely examples, and the present disclosure is not limited thereto.

Like reference numerals indicate like elements throughout the specification. Further, in the following description, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only." Any references to singular may include plural unless expressly stated otherwise. Components are interpreted to include an ordinary error range even if not expressly stated. When the position relation between two parts is described using the terms such as "on," "above," "below," "next to," or "adjacent to," one component may be positioned between the two components unless the terms are used with the term "immediately" or "directly," When an element or layer is disposed "on" another element or layer, another layer or another element may be interposed directly on the other element or therebetween.

FIG. 1A is a schematic block diagram for explaining a processor and an artificial neural network memory controller of an artificial neural network memory system based on an artificial neural network data locality according to an exemplary embodiment of the present disclosure.

Referring to FIG. 1A, the artificial neural network memory system 100 may be configured to include at least one processor 110 and at least one artificial neural network memory controller 120. That is, at least one processor 110 according to the exemplary embodiments of the present disclosure is provided and a plurality of processors may be utilized, and at least one artificial neural network memory controller 120 according to the exemplary embodiments of the present disclosure is provided and a plurality of artificial neural network memory controllers may be utilized.

Hereinafter, for the convenience of description, when at least one processor 110 is one processor, it may be referred to as a processor 110.

Hereinafter, for the convenience of description, when at least one artificial neural network memory controller 120 is one artificial neural network memory controller 120, it may be referred to as an artificial neural network memory controller 120.

The processor 110 is configured to process an artificial neural network model. For example, the processor 110 processes inference of an artificial neural network model which is trained to perform a specific inference function to provide an inference result of the artificial neural network model in accordance with the input data. For example, the processor 110 processes the learning of the artificial neural network model for performing a specific inference function to provide a trained artificial neural network model. The specific inference function may include various inference functions which may be inferred by the artificial neural network, such as object recognition, voice recognition, and image processing.

The processor 110 may be configured to include at least one of a central processing unit (CPU), a graphic processing unit (GPU), an application processor (AP), a digital signal processing device (DSP), an arithmetic and logic unit (ALU), and an artificial neural network processing unit (NPU). However, the processor 110 of the present disclosure is not limited to the above-described processors.

The processor 110 may be configured to communicate with the artificial neural network memory controller 120. The processor 110 may be configured to generate a data access request. The data access request may be transmitted to the artificial neural network memory controller 120. Here, the data access request may refer to a request to access data required by the processor 110 to process the inference or the learning of the artificial neural network model.

The processor 110 may transmit a data access request to the artificial neural network memory controller 120 to be supplied with data required for the inference or the learning of the artificial neural network model from the artificial neural network memory controller 120 or provide the inference or the learning result of the artificial neural network processed by the processor 110 to the artificial neural network memory controller 120.

The processor 110 may provide the inference result or learning result obtained by processing a specific artificial neural network model. At this time, the processor 110 may be configured to process the operations of the artificial neural network for inference or learning in a specific sequence.

The reason why the processor 110 needs to process the operations of the artificial neural network in a specific sequence is that each artificial neural network model is configured to have a unique artificial neural network structure. That is, each artificial neural network model is configured to have a unique artificial neural network data locality in accordance with the unique artificial neural network structure. Moreover, an operating sequence of the artificial neural network model which is processed by the processor 110 is determined in accordance with the unique artificial neural network data locality.

In other words, the artificial neural network data locality may be configured when the artificial neural network model is compiled by a complier to be executed in a specific processor. The artificial neural network data locality may be configured in accordance with algorithms applied to the complier and the artificial neural network model and an operation characteristic of the processor.

The artificial neural network model to be processed by the processor 110 may be compiled by the processor 110 and a compiler which may consider an algorithm characteristic of the artificial neural network model. That is, when the driving characteristic of the processor 110 is known with the knowledge of the structure and algorithm information of the artificial neural network model, the compiler may be configured to supply the artificial neural network data locality information in the order of the word unit to the artificial neural network memory controller 120.

For example, a weight value of a specific layer of a specific artificial neural network model of an algorithm level of the related art may be calculated in the layer unit. However, the weight value of the specific layer of the specific artificial neural network model of the processor-memory level according to the exemplary embodiments of the present disclosure may be calculated in the word unit scheduled to be processed by the processor 110.

For example, when a size of the cache memory of the processor 110 is smaller than a data size of weights of a specific layer of an artificial neural network model to be processed, the processor 110 may be compiled so as not to process the weight values of the specific layer at one time.

That is, when the processor 110 calculates the weight values of the specific layer and node values, a cache memory space in which result values are stored may be insufficient due to the weight value which is too large. In this case, a data access request generated by the processor 110 may be increased to a plurality of data access requests. Accordingly, the processor 110 may be configured to process the increased data access requests in a specific order. In this case, the operation sequence of the algorithm level and the operation order in accordance with the artificial neural network data locality of the processor-memory level may be different from each other.

That is, the artificial neural network operation sequence at the algorithm level may be reconstructed by the artificial neural network data locality of the processor-memory level by considering hardware characteristics of the processor and the memory to process the corresponding artificial neural network model.

The artificial neural network data locality of the artificial neural network model existing at the processor-memory level may be defined as information which predicts an operation order of the artificial neural network model to be processed by the processor 110 at the processor-memory level based on a data access request order which is requested to the memory by the processor 110.

In other words, even in the same artificial neural network model, the artificial neural network data locality of the artificial neural network model may be diversely configured in accordance with an operation function of the processor 110, such as a feature map tiling technique or a stationary technique of the processing element, a cache memory capacity such as the number of processing elements of the processor 110, a feature map in the processor 110, and a weight, a memory layered structure in the processor 110, and an algorithm characteristic of a compiler which determines an sequence of the calculating operation of the processor 110 to calculate the artificial neural network model.

For example, the feature map tiling technique is an artificial neural network technique which divides a convolution and as a convolutional area is divided, the feature map is divided to be calculated. Accordingly, even the same artificial neural network model may have different artificial neural network data localities due to the tiling convolution.

For example, the stationary technique is a technique which controls a driving method of processing elements PE in the neural network processing unit. According to the stationary technique, a data type to be processed, for example, one of an input feature map, a weight, and an output feature map is fixed to the processing element to be reused. Accordingly, a type of data or sequence which is requested to the memory by the processor 110 may vary.

That is, even in the same artificial neural network model, the artificial neural network data locality may be reconstructed in accordance with various algorithms and/or techniques. Accordingly, the artificial neural network data locality may be entirely or partially reconstructed by various conditions, such as a processor, a compiler, or a memory.

FIG. 1B is a schematic diagram illustrating an example of an exemplary neural network processing unit for explaining reconstruction of an artificial neural network data locality pattern which is applicable to various exemplary embodiments of the present disclosure.

Referring to FIG. 1B, exemplary stationary techniques applicable when the processor 110 is a neural network processing unit NPU are illustrated.

The processing elements PE may be configured in the form of an array and each processing element may be configured to include a multiplier (×) and an adder (+). The processing elements PE may be connected to a buffer memory or a cache memory, for example, a global buffer. The processing elements PE may fix one data of an input feature map pixel (Ifmap pixel: I), a filter weight W, and a partial sum (Psum: P) to a register of the processing elements PE. The remaining data may be supplied as input data of the processing elements PE. When the accumulation of the partial sums P is completed, it may become an output feature map pixel.

(a) of FIG. 1B illustrates a weight stationary (WS) technique. According to the weight stationary (WS) technique, filter weights W0 to W7 are fixed to respective register files of the processing elements PE, and input feature map pixels I input to the processing elements PE in parallel move from a 0-th input feature map pixel I0 to an eighth input feature map pixel I8 to perform the operation. Partial sums P0 to P8 may be accumulated in the processing elements PE which are connected in series. The partial sums P0 to P8 may sequentially move to a subsequent processing element. All multiplication and accumulation (MAC) operations which use the fixed filter weights W0 to W7 need to be mapped to the same processing elements PE for serial processing.

According to the above-described configuration, during the convolutional operation of the filter weight W in the register file, the reuse of the filter weight W is maximized to minimize the access energy consumption of the filter weight W.

It should be noted that as the weight stationary WS technique is applied to the artificial neural network model in a compile step, the artificial neural network data locality of the artificial neural network model is reconstructed to be optimized for the weight stationary WS technique at the processor-memory level. For example, according to the weight stationary WS technique, for the purpose of the efficiency of the operation, the filter weights W0 to W7 may be preferentially stored in the processing elements PE. Accordingly, the artificial neural network data locality may be reconstructed in the order of the filter weight W, the input feature map pixel I, and the partial sum P so that the data access request sequence generated by the processor 110 may be determined in accordance with the reconstructed artificial neural network data locality.

(b) of FIG. 1B illustrates an output stationary (OS) technique. According to the output stationary (OS) technique, the partial sums P0 to P7 are fixed to the respective register files of the processing elements PE to be accumulated and the filter weight W which is input to the processing elements PE in parallel moves from the 0-th input filter weight W0 to the seventh filter weight W7 to perform the operation. The input feature map pixels I0 to I7 may move to the processing elements PE connected in series. Each partial sum P0 to P7 needs to be fixed to each processing element PE to be mapped to perform the multiplication and accumulation (MAC) operation.

According to the above-described configuration, during the convolutional operation of the filter weight W in the processing elements PE, the partial sum P is fixed to the register file of the processing elements PE to maximize the reuse of the partial sum P and minimize the energy consumption in accordance with the movement of the partial sum P. When the accumulation of the fixed partial sums P is completed, it may become an output feature map.

It should be noted that as the processor 110 applies the output stationary OS technique, the artificial neural network data locality of the artificial neural network model is reconstructed to be optimized for the output stationary OS technique at the processor-memory level. For example, according to the output stationary OS technique, for the purpose of the efficiency of the operation, the partial sums P0 to P7 are preferentially stored in the processing elements PE. Accordingly, the artificial neural network data locality may be reconstructed in the order of the partial sum P, the filter weight W, and the input feature map pixel I, so that the data access request sequence generated by the processor 110 may be determined in accordance with the reconstructed artificial neural network data locality. The artificial neural network model compiler receives hardware characteristic information of the processor 110 and the memory to be converted into a code in which the artificial neural network model operates at the processor-memory level. At this time, the artificial neural network model is converted into a code which is executed by the processor so that the artificial neural network model may be converted into a low-level code.

That is, according to the above-described factors, even though the same artificial neural network model is processed, the processor 110 may change an order of data required at every moment in the clock unit. Accordingly, the artificial neural network data locality of the artificial neural network model may be configured to be different at the hardware level.

However, when the configuration of the artificial neural network data locality is completed, the operation order of the processor 110 and a data processing order required for the operation may be accurately repeated at every learning operation or inference operation of the corresponding artificial neural network model.

Hereinafter, the above-described artificial neural network memory system 100 according to the exemplary embodiment of the present disclosure may be configured to predict next data to be requested by the processor 110 based on an accurate operation order provided by the artificial neural network data locality to improve a memory latency problem and a memory bandwidth problem, thereby improving the operation processing performance of the artificial neural network and reducing the power consumption.

The artificial neural network memory controller 120 according to the exemplary embodiment of the present disclosure is configured to be provided with the artificial neural network data locality information of the artificial neural network model to be processed by the processor 110 or configured to analyze the artificial neural network data locality of the artificial neural network model which is being processed by the processor 110.

The artificial neural network memory controller 120 may be configured to receive the data access request generated by the processor 110.

The artificial neural network memory controller 120 may be configured to monitor or record the data access request received from the processor 110. The artificial neural network memory controller 120 observes the data access requests output by the processor 110 which is processing the artificial neural network model to precisely predict the data access que which will be requested later. One data access request may be configured to include at least one word unit data.

The artificial neural network memory controller 120 may be configured to sequentially record or monitor the data access request received from the processor 110.

The data access requests which are recorded by the artificial neural network memory controller 120 may be stored in various forms such as a log file, a table, or a list. However, the artificial neural network memory controller 120 according to the exemplary embodiment of the present disclosure is not limited to the recorded type or formant of the data access request.

The data access requests which are monitored by the artificial neural network memory controller 120 may be stored in an arbitrary memory in the artificial neural network memory controller 120. However, the artificial neural network memory controller 120 according to the exemplary embodiment of the present disclosure is not limited to the monitoring method of the data access request.

The artificial neural network memory controller 120 may be configured to further include an arbitrary memory for recording or monitoring the data access request. However, the artificial neural network memory controller 120 according to the exemplary embodiment of the present disclosure is not limited thereto and may be configured to communicate with an external memory.

The artificial neural network memory controller 120 may be configured to monitor or record the data access request received from the processor 110 to analyze the data access requests.

That is, the artificial neural network memory controller 120 may be configured to analyze the received data access requests to analyze the artificial neural network data locality of the artificial neural network model which is being processed by the processor 110.

That is, the artificial neural network memory controller 120 may be configured to analyze the artificial neural network data locality of the artificial neural network model which is compiled to operate at the processor-memory level.

That is, the artificial neural network memory controller 120 may be configured to analyze the operation processing order of the artificial neural network in the unit of memory access requests generated by the processor, based on the artificial neural network data locality of the artificial neural network model at the processor-memory level to analyze the artificial neural network data locality of the artificial neural network model.

According to the above-described configuration, the artificial neural network memory controller 120 may analyze the artificial neural network data locality reconstructed at the processor-memory level.

In some exemplary embodiments, the compiler may be configured to analyze the artificial neural network data locality of the artificial neural network model in the word unit.

In some exemplary embodiments, at least one artificial neural network memory controller may be configured to be provided with the artificial neural network data locality, which is analyzed by the compiler, in the word unit. Here, the word unit may vary to 8 bits, 16 bits, 32 bits, 64 bits, or the like, in accordance with the word unit of the processor 110. Here, the word unit may be set to different word units such as 2 bits, 3 bits, or 5 bits, in accordance with a quantization algorithm of the kernel, the feature map, or the like of the compiled artificial neural network model.

The artificial neural network memory controller 120 may be configured to include a special function register. The special function register may be configured to store the artificial neural network data locality information.

The artificial neural network memory controller 120 may be configured to operate in different modes depending on whether the artificial neural network data locality information is stored.

If the artificial neural network memory controller 120 stores the artificial neural network data locality information, the artificial neural network memory controller 120 may predict the data processing sequence of the artificial neural network model to be processed by the processor 110 in the word unit order in advance so that the artificial neural network memory controller 120 may be configured so as not to record a separate data access request. However, it is not limited thereto and the artificial neural network memory controller 120 may be configured to verify whether an error exists in the stored artificial neural network data locality while comparing the stored artificial neural network data locality information and the data access request generated by the processor.

If the artificial neural network memory controller 120 is not provided with the artificial neural network data locality information, the artificial neural network memory controller 120 may be configured to observe the data access request generated by the processor 110 to operate in a mode in which the artificial neural network data locality of the artificial neural network model processed by the processor 110 is predicted.

In some exemplary embodiments, the artificial neural network memory system may be configured to include a processor, a memory, and a cache memory and generate an advance data access request including data to be requested by the processor based on the artificial neural network data locality information. The artificial neural network memory system may be configured to store data corresponding to the advance data access request from the memory in the cache memory before the request of the processor. At this time, the artificial neural network memory system may be configured to operate in any one mode of a first mode configured to operate by receiving the artificial neural network data locality information and a second mode configured to operate by observing data access requests generated by the processor to predict the artificial neural network data locality information. According to the above-described configuration, when the artificial neural network memory system is provided with the artificial neural network data locality information, the data to be requested by the processor is predicted and prepared in advance in the word unit. Further, even though the artificial neural network data locality information is not provided, the data access requests generated by the processor are monitored for a predetermined period to predict the artificial neural network data locality which is being processed by the processor in the data access request unit. Moreover, even though the artificial neural network data locality information is provided, the artificial neural network memory system independently monitors the data access request to reconstruct the artificial neural network data locality to verify the provided artificial neural network data locality. Accordingly, the change or the error of the artificial neural network model may be sensed.

In some exemplary embodiments, at least one artificial neural network memory controller and at least one processor may be configured to directly communicate with each other. According to the above-described configuration, the artificial neural network memory controller may directly receive the data access request from the processor so that a latency caused by a system bus between the processor and the artificial neural network memory controller may be eliminated. In other words, for the direct communication of the processor and the artificial neural network memory controller, a dedicated bus may be further included, or a dedicated communication channel may be further included, but it is not limited thereto.

In some exemplary embodiments, the artificial neural network data locality information may be configured to be selectively stored in the processor 110 and/or the artificial neural network memory controller 120. The artificial neural network data locality information may be configured to be stored in a special function register included in the processor 110 and/or the artificial neural network memory controller 120. However, it is not limited thereto, and the artificial neural network data locality information may be configured to be stored in an arbitrary memory or a register which is communicable with the artificial neural network memory system.

FIG. 2 is a schematic diagram for explaining an artificial neural network data locality pattern according to an exemplary embodiment of the present disclosure. Hereinafter, an artificial neural network data locality and an artificial neural network data locality pattern of the artificial neural network model will be described with reference to FIG. 2.

The artificial neural network memory controller 120 is configured to record or monitor the data access request received from the processor 110 according to an order.

The artificial neural network memory controller 120 is configured to generate an artificial neural network data locality pattern including a data locality of the artificial neural network model which is being processed by the processor 110. That is, the artificial neural network memory controller 120 may be configured to analyze the data access requests associated with the artificial neural network model generated by the processor 110 to generate a repeated specific pattern. That is, when the data access request is observed, the artificial neural network data locality information may be stored as the artificial neural network data locality pattern.

Referring to FIG. 2, eighteen data access requests are sequentially recorded in the artificial neural network memory controller 120 as an example. Each data access request is configured to include identification information.

The identification information included in the data access request may be configured to include various information.

For example, the identification information may be configured to include at least a memory address value and an operation mode value.

For example, the memory address value may be configured to include memory address values corresponding to the requested data, but the present disclosure is not limited thereto.

For example, the memory address value may be configured to include a start value and an end value of the memory address corresponding to the requested data. According to the above-described configuration, it is considered that data is sequentially stored between the start value and the end value of the memory address. Therefore, a capacity for storing the memory address values may be reduced.

For example, the memory address value may be configured to include a start value of the memory address corresponding to the requested data and a data continuous read trigger value. According to the above-described configuration, data may be continuously read from the start value of the memory address until the continuous read trigger value changes. According to the above-described configuration, data may be continuously read so that the memory effective bandwidth may be increased.

For example, the memory address value may be configured to include a start value of the memory address corresponding to the requested data and information about the number of data. The unit of the number of data may be determined based on the unit of the memory capacity. For example, the unit may be one of one byte which is 8 bits, one word which is 4 bytes, and one block which is 1024 bytes, but the present disclosure is not limited thereto. According to the above-described configuration, the data may be continuously read from the start value of the memory address as many as the number of data of the set unit size. According to the above-described configuration, data may be continuously read so that the memory effective bandwidth may be increased.

For example, when the memory is a nonvolatile memory, the memory address value may further include a physical-logical address mapping table or flash translation layer information, but the present disclosure is not limited thereto.

For example, the operation mode may be configured to include a read mode and a write mode.

For example, the operation mode may be configured to further include overwrite, but the present disclosure is not limited thereto.

The artificial neural network memory controller 120 may be configured to determine whether the identification information of each of the data access requests is the same.

For example, the artificial neural network memory controller 120 may be configured to determine whether the memory address and the operation mode of each of the data access requests are the same. In other words, the artificial neural network memory controller 120 may be configured to detect a data access request value having the same memory address value and the same operation mode.

For example, when a memory address value and an operation mode of a first data access request are the same as a memory address value and an operation mode of a tenth data access request, the artificial neural network memory controller 120 is configured to generate an artificial neural network data locality pattern corresponding to the corresponding memory address value and operation mode.

The artificial neural network data locality pattern is configured to include data in which addresses of the memory of the data access requests are sequentially recorded.

That is, the artificial neural network memory controller 120 may be configured to detect a repeating cycle of the data access requests having the same memory address value and operation mode to generate an artificial neural network data locality pattern configured by the data access requests with repeated memory address value and operation mode.

That is, the artificial neural network memory controller 120 may be configured to generate the artificial neural network data locality pattern by detecting the repeated pattern of the memory address included in the data access request.

Referring to FIG. 2, when the artificial neural network memory controller 120 identifies that the memory address value and the operation mode of the first data access request are the same as the memory address value and the operation mode of the tenth data access request, the artificial neural network memory controller 120 may be configured to generate one artificial neural network data locality pattern from a starting data access request to an advance data access request of the repeated data access request, among the same data access requests. In this case, the artificial neural network memory controller 120 may be configured to generate the artificial neural network data locality pattern including a first data access request to a ninth data access request.

That is, the artificial neural network data locality pattern described with reference to FIG. 2 may be configured to include the memory address values and the operation mode values in the order of the first data access request, a second data access request, a third data access request, a fourth data access request, a fifth data access request, a sixth data access request, a seventh data access request, an eighth data access request, and a ninth data access request.

The artificial neural network data locality pattern generated by the artificial neural network memory controller 120 may be stored in various forms such as a log file, a table, or a list and the artificial neural network memory controller 120 according to the exemplary embodiment of the present disclosure is not limited to a recorded type or format of the artificial neural network data locality pattern.

The artificial neural network data locality pattern generated by the artificial neural network memory controller 120 may be stored in an arbitrary memory of the artificial neural network memory controller 120 and the artificial neural network memory controller 120 according to the exemplary embodiment of the present disclosure is not limited to a structure or a method of a memory which stores the artificial neural network data locality pattern.

The artificial neural network memory controller 120 may be configured to further include an arbitrary memory for storing the artificial neural network data locality pattern. However, the artificial neural network memory controller 120 according to the exemplary embodiment of the present disclosure is not limited thereto and may be configured to communicate with an external memory.

That is, the artificial neural network memory system 100 according to the exemplary embodiment of the present disclosure may be configured to include at least one processor 110 configured to generate a data access request corresponding to the artificial neural network operation and an artificial neural network memory controller 120 configured to sequentially record the data access request to generate an artificial neural network data locality pattern.

When the artificial neural network memory controller 120 generates an artificial neural network data locality pattern, the artificial neural network memory controller 120 may be configured to determine whether the memory address value and the operation mode value of the data access request received from the processor 110 match any one of the memory address values and the operation mode value included in the previously generated artificial neural network data locality pattern.

Referring to FIG. 2, when the artificial neural network memory controller 120 receives the tenth data access request from the processor 110, the artificial neural network memory controller 120 may be configured to determine whether the received data access request has the same memory address value as the memory address value included in the artificial neural network data locality pattern.

Referring to FIG. 2, when the artificial neural network memory controller 120 receives the tenth data access request, the artificial neural network memory controller 120 may be configured to detect that a start value [0] and an end value [0x1000000] which are the memory address values of the tenth data access request are the same as a start value [0] and an end value [0x1000000] which are the memory address values of the first data access request and detect that a read mode value of an operation mode of the tenth data access request is the same as a read mode value of an operation mode of the first data access request to determine that the tenth data access request is the same as the first data access request and the tenth data access request is an artificial neural network operation.

When the artificial neural network memory controller 120 receives an eleventh data access request, the artificial neural network memory controller 120 may be configured to detect that a start value [0x1100000] and an end value [0x1110000] which are the memory address values of the eleventh data access request are the same as a start value [0x1100000] and an end value [0x1110000] which are the memory address values of the second data access request and detect that a write mode value of an operation mode of the eleventh data access request is the same as a write mode value of an operation mode of the second data access request to determine that the eleventh data access request is the same as the second data access request and the eleventh data access request is an artificial neural network operation.

Referring to FIG. 2 again, the artificial neural network memory controller 120 does not generate the artificial neural network data locality pattern from the first data access request to the ninth data access request. In this case, the artificial neural network memory controller 120 is initialized or the processor 110 does not perform the artificial neural network operation. Accordingly, the artificial neural network memory controller 120 does not detect the matching of the pattern to the ninth data access request. The artificial neural network memory controller 120 may determine the identity to the first data access request at the time of the tenth data access request, generate the artificial neural network data locality pattern, and record whether the patterns match. The tenth data access request to the eighteenth data access request are the same as the first data access request to the ninth data access request so that the artificial neural network memory controller 120 may determine that the patterns of the tenth data access request to the eighteenth data access request match the artificial neural network data locality pattern.

That is, the artificial neural network memory controller 120 may be configured to determine whether an operation which is being processed by the processor 110 is an artificial neural network operation by utilizing the artificial neural network data locality pattern. According to the above-described configuration, even though the artificial neural network memory controller 120 receives only the data access request including the memory address value and the operation mode value generated by the processor 110, the artificial neural network memory controller 120 may determine that the processor 110 is processing the artificial neural network operation. Accordingly, the artificial neural network memory controller 120 may determine whether the processor 110 is currently performing the artificial neural network operation based on the artificial neural network data locality pattern, without having separate additional identification information.

As it will be additionally described with reference to FIG. 2, each data access request may be configured to be stored as a token. For example, the data access request of each artificial neural network may be tokenized to be stored. For example, the data access request of each artificial neural network may be tokenized based on the identification information. For example, the data access request of each artificial neural network may be tokenized based on the memory address value. However, the exemplary embodiments of the present disclosure are not limited thereto, and the token may be referred to as a code, an identifier, or the like.

For example, the first data access request may be stored as a token [1]. The fourth data access request may be stored as a token [4]. The seventh data access request may be stored as a token [7]. For example, the artificial neural network data locality pattern may be stored as tokens [1-2-3-4-5-6-7-8-9]. For example, the tenth data access request has the same memory address value and the same operation mode value as the token [1] so that the tenth data access request may be stored as the token [1]. The thirteenth data access request has the same memory address value and the same operation mode value as the token [4] so that the thirteenth data access request may be stored as the token [4]. Accordingly, when the artificial neural network memory controller 120 detects the same token as the token of the artificial neural network data locality pattern, the artificial neural network memory controller may be configured to determine that the corresponding data access request is an artificial neural network operation.

According to the above-described configuration, the artificial neural network memory controller 120 may easily and quickly recognize and distinguish the data access request by utilizing the tokenized artificial neural network data locality pattern. Moreover, even when additional identification information and/or data is further added to the data access request, the artificial neural network memory controller uses the same token to utilize the token even when the additional information of the data access request is increased to easily and quickly recognize and distinguish the data access request.

In some exemplary embodiments, the artificial neural network data locality pattern stored in the artificial neural network memory controller may be eliminated or initialized. For example, when the artificial neural network data locality pattern is not utilized while the predetermined time is expired, for example, when the data access request matching the artificial neural network data locality pattern is not generated for a specific time, the artificial neural network memory controller determines that the utilizing frequency of the artificial neural network data locality pattern is low to eliminate or initialize the artificial neural network data locality pattern.

According to the above-described configuration, the availability of the storage space of the memory which stores the artificial neural network data locality pattern may be improved.

In some exemplary embodiments, the artificial neural network memory controller may be configured to store an updated pattern and a previous pattern of the artificial neural network data locality pattern to determine whether the artificial neural network model is changed. That is, when there is a plurality of artificial neural network models, the artificial neural network memory controller may be configured to further generate artificial neural network data locality patterns corresponding to the number of artificial neural network models.

For example, when a first artificial neural network data locality pattern is a token [1-2-3-4-5-6-7-8-9] and a second artificial neural network data locality pattern is a token [11-12-13-14-15-16], if the processor generates a data access request corresponding to the token [1], the artificial neural network memory controller may be configured to select the first artificial neural network data locality pattern. Alternatively, if the processor generates a data access request corresponding to the token [11], the artificial neural network memory controller may be configured to select the second artificial neural network data locality pattern.

According to the above-described configuration, the artificial neural network memory controller may store a plurality of artificial neural network data locality pattern and, when the artificial neural network model processed by the processor is changed to another artificial neural network model, may quickly apply a previously stored artificial neural network data locality pattern.

In some exemplary embodiments, the artificial neural network memory controller may be configured to determine whether the data access requests are requests of one artificial neural network model or are mixtures of the requests of the plurality of artificial neural network models. Further, the artificial neural network memory controller may be configured to predict the data access request corresponding to the artificial neural network data locality of each of the plurality of artificial neural network models.

For example, the processor may simultaneously process the plurality of artificial neural network models and, in this case, the data access request generated by the processor may be mixed data access requests corresponding to the plurality of artificial neural network models.

For example, when a first artificial neural network data locality pattern is a token [1-2-3-4-5-6-7-8-9] and a second artificial neural network data locality pattern is a token [11-12-13-14-15-16], the processor 110 may generate tokens corresponding to data access requests in the order of [1-11-2-3-12-13-14-4-5-6-15-16-7-8-9].

The artificial neural network memory controller knows each artificial neural network data locality pattern, so that even though the token [1] is generated and then the token [11] is generated, the artificial neural network memory controller may predict that the token [2] will be generated next. Therefore, the artificial neural network memory controller may generate an advance data access request corresponding to the token [2]. Further, even though the token [2] is generated after the token [11] is generated, the artificial neural network memory controller may predict that the token [12] will be generated next. Therefore, the artificial neural network memory controller may generate an advance data access request corresponding to the token [12].

According to the above-described configuration, the artificial neural network memory controller 120 predicts the data access requests to be generated by the processor 110 which processes the plurality of artificial neural network models, for every artificial neural network model, to predict and prepare the data to be requested by the processor 110.

In some exemplary embodiments, the artificial neural network memory controller may be configured to store a plurality of artificial neural network data locality patterns.

For example, when the processor processes two artificial neural network models, the artificial neural network memory controller may be configured to store the artificial neural network data locality pattern of each artificial neural network model.

According to the above-described configuration, when the operation of each artificial neural network model is processed, a next data access request corresponding to each model may be predicted so that according to the exemplary embodiment of the present disclosure, the processing speed of the artificial neural network operation may be improved.

In some exemplary embodiments, the artificial neural network memory controller may be configured to further include an artificial neural network model which is configured to machine-learn the artificial neural network data locality pattern.

According to the above-described configuration, the artificial neural network model of the artificial neural network memory controller may be configured to perform reinforcement learning on the data access request generated by the processor in real time. Further, the artificial neural network model of the artificial neural network memory controller may be a model trained by utilizing the artificial neural network data locality patterns of the artificial neural network model which has been well-known in the related art as learning data. Accordingly, the artificial neural network memory controller may extract the artificial neural network data locality pattern from various artificial neural network models. Specifically, when various artificial neural network models are processed by requests of a plurality of users, like a server, this method may be effective.

As it will be additionally described with reference to FIG. 2, the artificial neural network memory controller 120 may be configured to monitor the artificial neural network model processed by the processor 110 dynamically and in real time and determine whether the artificial neural network model is changed.

For example, the artificial neural network memory controller 120 may be configured to statistically utilize a pattern matching frequency of the artificial neural network data locality pattern to determine the reliability of the artificial neural network data locality pattern. It may be configured such that, as the pattern matching frequency of the artificial neural network data locality pattern is increased, the reliability of the artificial neural network data locality pattern is increased and such that, as the pattern matching frequency of the artificial neural network data locality pattern is reduced, the reliability of the artificial neural network data locality pattern is reduced.

According to the above-described configuration, when the processor 110 repeatedly processes the specific artificial neural network model, the artificial neural network memory controller 120 may improve the prediction reliability of the artificial neural network data locality of the specific artificial neural network model.

FIG. 3 is a schematic diagram illustrating an exemplary artificial neural network model for explaining an artificial neural network data locality pattern which is applicable to various exemplary embodiments of the present disclosure.

An exemplary artificial neural network model 1300 which is being processed by the processor 110 as illustrated in FIG. 3 may be an arbitrary artificial neural network model which is trained to perform a specific inference function. For the convenience of description, an artificial neural network model in which all nodes are fully connected has been illustrated, but the present disclosure is not limited thereto.

Even though not illustrated in FIG. 3, an artificial neural network model applicable to the present disclosure may be a convolutional neural network (CNN) which is one of deep neural networks (DNN). An exemplary artificial neural network model may be a model such as a fully convolutional network (FCN) having VGG, VGG16, DenseNET, and an encoder-decoder structure, a deep neural network (DNN) such as SegNet, DeconvNet, DeepLAB V3+, or U-net, or SqueezeNet, Alexnet, ResNet18, MobileNet-v2, GoogLeNet, Resnet-v2, Resnet50, Resnet101, and Inception-v3 or an ensemble model based on at least two different models, but the artificial neural network model of the present disclosure is not limited thereto.

The above-described exemplary artificial neural network models may be configured to have an artificial neural network data locality.

Referring to FIG. 3 again, the artificial neural network data locality of the artificial neural network model processed by the processor 110 will be described in detail.

The exemplary artificial neural network model 1300 includes an input layer 1310, a first connection network 1320, a first hidden layer 1330, a second connection network 1340, a second hidden layer 1350, a third connection network 1360, and an output layer 1370.

The connection networks of the artificial neural network have corresponding weight values. A weight value of the connection network is multiplied with the input node value and an accumulated value of multiplied values is stored in the node of the corresponding output layer.

In other words, the connection network of the artificial neural network model 1300 is represented by lines, and weight is represented by a symbol ⊗.

In other words, various activation functions to impart non-linearity to the accumulated value may be additionally provided. The activation function may be, for example, a sigmoid function, a hyperbolic tangent function, or an ReLU function, but the present disclosure is not limited thereto.

The input layer 1310 of the exemplary artificial neural network model 1300 includes input nodes x1 and x2.

The first connection network 1320 of the exemplary artificial neural network model 1300 includes connection networks having six weight values which connect nodes of the input layer 1310 and nodes of the first hidden layer 1330.

The first hidden layer 1330 of the exemplary artificial neural network model 1300 includes nodes a1, a2, and a3. Weight values of the first connection network 1320 are multiplied with a node value of the corresponding input layer 1310 and an accumulated value of the multiplied values is stored in the first hidden layer 1330.

The second connection network 1340 of the exemplary artificial neural network model 1300 includes connection networks having nine weight values which connect nodes of the first hidden layer 1330 and nodes of the second hidden layer 1350.

The second hidden layer 1350 of the exemplary artificial neural network model 1300 includes nodes b1, b2, and b3. The weight value of the second connection network 1340 is multiplied with the node value of the corresponding first hidden layer 1330 and the accumulated value of the multiplied values is stored in the second hidden layer 1350.

The third connection network 1360 of the exemplary artificial neural network model 1300 includes connection networks having six weight values which connect nodes of the second hidden layer 1350 and nodes of the output layer 1370.

The output layer 1370 of the exemplary artificial neural network model 1300 includes nodes y1 and y2. The weight value of the third connection network 1360 is multiplied with the input node value of the corresponding second hidden layer 1350 and the accumulated value of the multiplied values is stored in the output layer 1370.

According to the structure of the above-described artificial neural network model 1300, it is recognized that the operation for each layer needs to be sequentially performed. That is, there may be a problem in that when the structure of the artificial neural network model is confirmed, the operation order for every layer needs to be determined and when the operation is performed in a different order, the inference result may be inaccurate. The order of the operation or an order of the data flow in accordance with the structure of the artificial neural network model may be defined as an artificial neural network data locality.

In addition, for the convenience of description, in FIG. 2, even though the layer unit is described, the exemplary embodiments of the present disclosure are not limited to the layer unit. The processor 110 according to the exemplary embodiments of the present disclosure processes the data based on the artificial neural network data locality so that the processor may operate in the word unit or the data access request unit, rather than the layer unit. Here, the data size of the data access request may be smaller than or equal to the data size of the corresponding layer.

Referring to FIG. 3 again, for example, for the multiplication operation of the weight values of the first connection network 1320 and the node value of the input layer 1310, the processor 110 may generate the data access request in the layer unit.

However, the layer operation of the weight values of the first connection network 1320 and the node values of the input layer 1310 is not processed as one data access request, but may be processed as a plurality of divided sequential data access requests in accordance with the feature map division convolution of the processor 110, the stationary technique of the processing element, the number of processing elements of the processor, the cache memory capacity of the processor 110, a memory layered structure of the processor 110, and/or the compiler algorithm of the processor 110.

When a data access request to be requested by the processor 110 is divided into a plurality of data access requests, the order of requesting the divided data access requests may be determined by the artificial neural network data locality. At this time, the artificial neural network memory controller 120 may be configured to be provided with the artificial neural network data locality to be prepared to provide data corresponding to a next data access request to be requested by the processor 110. Alternatively, the artificial neural network memory controller 120 may be configured to predict the artificial neural network data locality to be prepared to provide data corresponding to a next data access request to be requested by the processor 110.

Data access requests which are generated by the processor 110 during the artificial neural network operation of the artificial neural network model 1300 illustrated in FIG. 3 and an artificial neural network data locality will be described.

The processor 110 generates a first data access request to read input node values of the input layer 1310 of the artificial neural network model 1300. The first data access request includes a first memory address value and a read mode value. The first data access request may be stored as the token [1].

Next, the processor 110 generates a second data access request to read weight values of the first connection network 1320 of the artificial neural network model 1300. The second data access request includes a second memory address value and a read mode value. The second data access request may be stored as the token [2].

Next, the processor 110 generates a third data access request for storing the node values of the first hidden layer 1330 obtained by multiplying and accumulating the weight values of the first connection network 1320 of the artificial neural network model 1300 and the node values of the input layer 1310. The third data access request includes a third memory address value and a write mode value. The third data access request may be stored as the token [3].

Next, the processor 110 generates a fourth data access request to read node values stored in the first hidden layer 1330 of the artificial neural network model 1300. The fourth data access request includes a third memory address value and a read mode value. The fourth data access request may be stored as the token [4].

Next, the processor 110 generates a fifth data access request to read weight values of the second connection network 1340 of the artificial neural network model 1300. The fifth data access request includes a fifth memory address value and a write mode value. The fifth data access request may be stored as the token [5].

Next, the processor 110 generates a sixth data access request for storing the node values of the second hidden layer 1350 obtained by multiplying and accumulating the weight values of the second connection network 1340 of the artificial neural network model 1300 and the node values of the first hidden layer 1330. The sixth data access request includes a sixth memory address value and a write mode value. The sixth data access request may be stored as the token [6].

Next, the processor 110 generates a seventh data access request to read node values stored in the second hidden layer 1350 of the artificial neural network model 1300. The seventh data access request includes a sixth memory address value and a read mode value. The seventh data access request may be stored as the token [7].

Next, the processor 110 generates an eighth data access request to read weight values of the third connection network 1360 of the artificial neural network model 1300. The eighth data access request includes an eighth memory address value and a read mode value. The eighth data access request may be stored as the token [8].

Next, the processor 110 generates a ninth data access request for storing the node values of the output layer 1370 obtained by multiplying and accumulating the weight values of the third connection network 1360 of the artificial neural network model 1300 and the node values of the second hidden layer 1350. The ninth data access request includes a ninth memory address value and a write mode value. The ninth data access request may be stored as the token [9]. The node values may be a feature map, an activation map, or the like, but it is not limited thereto. The weight values may be a kernel window, but it is not limited thereto.

That is, the processor 110 needs to generate first to ninth data access requests for the inference of the exemplary artificial neural network model 1300. If the sequence of the data access request generated by the processor 110 is mixed, the artificial neural network data locality of the artificial neural network model 1300 is damaged so that an error may occur in the inference result of the artificial neural network model 1300 or the accuracy may be impaired. For example, the processor 110 may calculate the second layer first and then calculate the first layer. Accordingly, the processor 110 may be configured to sequentially generate the data access request based on the artificial neural network data locality. Therefore, it is assumed that the artificial neural network memory controller 120 may sequentially generate the data access request based on the artificial neural network data locality when the processor 110 operates the artificial neural network.

However, as described above, each data access request may be reinterpreted at the processor-memory level according to the hardware characteristic of the processor. In the above-described example, it has been described that the available capacity of the cache memory of the processor is sufficient and that the data size of the node value and the data size of the weight value are smaller than the available capacity of the cache memory. Accordingly, it is described that each layer is processed in one data access request unit. If the data size such as the weight value, the feature map, the kernel, the activation map, and the like of the artificial neural network model is larger than the available capacity of the cache memory of the processor, the corresponding data access request may be divided into a plurality of data access requests and in this case, the artificial neural network data locality of the artificial neural network model may be reconstructed.

The artificial neural network memory controller 120 according to the exemplary embodiment of the present disclosure may generate the artificial neural network data locality pattern so that the artificial neural network memory controller may operate to correspond to the artificial neural network data locality of the artificial neural network model to be actively processed by the processor.

That is, even though the actual artificial neural network data locality of the artificial neural network model which is being processed by the processor 110 is not known, the artificial neural network memory controller 120 may actually analyze the artificial neural network data locality by analyzing the recorded data access request.

That is, even though structure information of the artificial neural network model which is being processed by the processor 110 is not provided, the artificial neural network memory controller 120 may actually analyze the artificial neural network data locality by analyzing the recorded data access request.

In some exemplary embodiments, the artificial neural network memory controller may be configured to be provided with an artificial neural network data locality pattern which is generated in advance at the processor-memory level.

Figure 4:
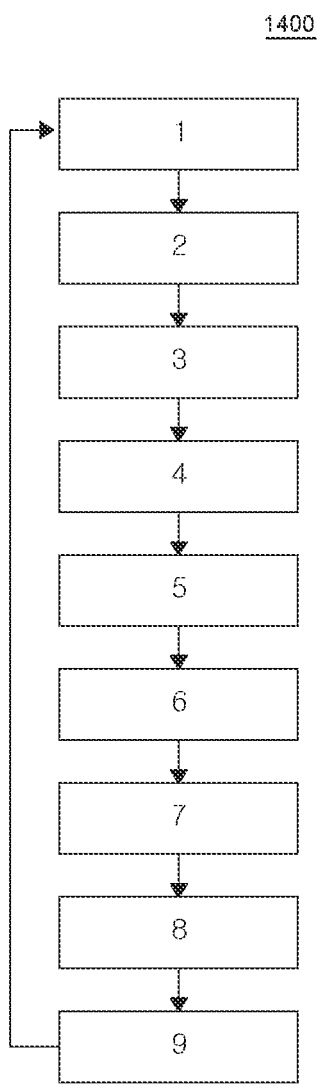
FIG. 4 is a schematic diagram for explaining an artificial neural network data locality pattern generated by analyzing the artificial neural network model of FIG. 3A by an artificial neural network memory controller according to an exemplary embodiment of the present disclosure.

FIG. 4 is a schematic diagram for explaining an artificial neural network data locality pattern obtained by analyzing the artificial neural network model of FIG. 3 by an artificial neural network memory controller according to an exemplary embodiment of the present disclosure. FIG. 5 is a schematic diagram for explaining a token and identification information corresponding to the artificial neural network data locality pattern of FIG. 4.

An artificial neural network data locality pattern 1400 illustrated in FIG. 4 is illustrated as a token just for the convenience of description. Referring to FIGS. 1A to 4, the artificial neural network data locality pattern 1400 of the artificial neural network model 1300 is stored as tokens [1-2-3-4-5-6-7-8-9]. Identification information corresponding to the token corresponding to the artificial neural network data locality pattern 1400 illustrated in FIG. 5 is illustrated.

Each data access request is configured to include identification information. Each data access request may be represented by a token, but it is just for the convenience of description so that the present disclosure is not limited to the token.

According to the artificial neural network data locality pattern 1400, the artificial neural network memory controller 120 may sequentially predict an order of tokens which will be generated after the present token.

For example, the artificial neural network data locality pattern 1400 may be configured to have a loop type pattern in which the orders are connected from the last token to the start token, but the present disclosure is not limited thereto.

For example, the artificial neural network data locality pattern 1400 may be configured by memory addresses having a repeated loop characteristic, but the present disclosure is not limited thereto.

For example, the artificial neural network data locality pattern 1400 may be configured to further include identification information for identifying the start and the end of the operation of the artificial neural network model, but the present disclosure is not limited thereto.

For example, the start and the end of the artificial neural network data locality pattern 1400 may be configured to be distinguished as a start token and a last token of the pattern, but the present disclosure is not limited thereto.

According to the above-described configuration, when the processor 110 repeatedly infers the specific artificial neural network model, since the artificial neural network data locality pattern 1400 is a loop type pattern, even though the present inference of the specific artificial neural network model ends, the start of the next inference may be predicted.

For example, in the case of the artificial neural network model which recognizes an object of an image of a front camera mounted in an autonomous vehicle at a speed of 30 IPS (inference per second), the same inference is continuously repeated at a specific cycle. Accordingly, when the above-described loop type artificial neural network data locality pattern is utilized, it is possible to predict the repeated data access request.

When the identification information is additionally described as an example, the token [3] and the token [4] of the artificial neural network data locality pattern 1400 have the same memory address value but have different operation modes. Accordingly, even though the memory address values are the same, the operations modes are different, so that the artificial neural network memory controller 120 may be configured to classify the third data access request and the fourth data access request as different tokens. However, the identification information of the exemplary embodiments of the present disclosure is not limited to the operation mode, but may be configured to predict the artificial neural network data locality pattern only with the memory address value.

The artificial neural network memory controller 120 may be configured to generate a corresponding advance data access request based on the artificial neural network data locality pattern 1400.

The artificial neural network memory controller 120 may be configured to sequentially further generate an advance data access request based on the artificial neural network data locality pattern 1400.

According to the above-described configuration, when the processor 110 generates a specific data access request included in the artificial neural network data locality pattern 1400, the artificial neural network memory controller 120 may sequentially predict at least one data access request after the specific data access request. For example, when the processor 110 generates the token [1], the artificial neural network memory controller 120 may predict that a data access request corresponding to the token [2] is subsequently generated. For example, when the processor 110 generates the token [3], the artificial neural network memory controller 120 may predict that a data access request corresponding to the token [4] is subsequently generated. For example, when the processor 110 generates the token [1], the artificial neural network memory controller 120 may predict that corresponding data access requests are generated in the order of tokens [2-3-4-5-6-7-8-9].

In other words, when the processor 110 processes a plurality of artificial neural network models, a data locality pattern which has not been predicted may intervene between the tokens of the artificial neural network data locality pattern 1400. For example, after the token [2], a new token [4] may be interrupted. However, even in this case, the artificial neural network memory controller 120 may predict and prepare that the processor 110 generates the token [3] after the token [2].

For example, when the processor 110 generates the token [9], the artificial neural network memory controller 120 may predict that the processor 110 generates the token [1].

FIG. 6 is a schematic diagram for explaining an advance data access request and a next data access request generated based on an artificial neural network data locality pattern by an artificial neural network memory controller according to an exemplary embodiment of the present disclosure.

The artificial neural network memory controller 120 according to the exemplary embodiment of the present disclosure may be configured to utilize the artificial neural network data locality pattern to predict a next data access request to be subsequently requested by the processor 110 to generate an advance data access request.

Referring to FIG. 6, the data access request token refers to a token corresponding to a data access request which is received from the processor 110 by the artificial neural network memory controller 120. The advance data access request token is a token corresponding to a data access request obtained by predicting a data access request to be subsequently requested by the processor 110, based on the artificial neural network data locality pattern by the artificial neural network memory controller 120. The next data access request token is a data access request token which is actually generated by the processor 110 after generating the advance data access request token, but the token of the present disclosure is just an example for the convenience of description so that the present disclosure is not limited to the token.

The data access request and the advance data access request may correspond to the data access request token. In this case, the data access request and the advance data access request matching a specific data access request token may be configured to have the same memory address. That is, the data access request and the advance data access request may be configured to include the same memory address.

For example, when the data access request token is [3] and the advance data access request token is [3], the memory address value of each token may be the same. That is, the data access request and the advance data access request may be configured to include the same operation mode value. For example, when the data access request token is [3] and the advance data access request token is [3], the operation mode value of each token may be the same.

Referring to FIG. 6, when the processor 110 generates the data access request corresponding to the token [1], the artificial neural network memory controller 120 generates the advance data access request corresponding to the token [2]. The processor 110 generates a next data access request corresponding to the token [2] after generating the advance data access request. The artificial neural network memory controller 120 is configured to determine whether the advance data access request precisely predicts the next data access request. The same token corresponds to the advance data access request and the next data access request so that the artificial neural network memory controller 120 may determine that the patterns match.

Next, for example, when the processor 110 generates the data access request corresponding to the token [2], the artificial neural network memory controller 120 generates the advance data access request corresponding to the token [3]. The processor 110 generates a next data access request corresponding to the token [3] after generating the advance data access request. The artificial neural network memory controller 120 is configured to determine whether the advance data access request precisely predicts the next data access request. The same token corresponds to the advance data access request and the next data access request so that the artificial neural network memory controller 120 may determine that the patterns match.

For example, when the processor 110 generates the data access request corresponding to the token [9], the artificial neural network memory controller 120 generates the advance data access request corresponding to the token [1]. The processor 110 generates a next data access request corresponding to the token [9] after generating the advance data access request. The artificial neural network memory controller 120 is configured to determine whether the advance data access request precisely predicts the next data access request. The same token corresponds to the advance data access request and the next data access request so that the artificial neural network memory controller 120 may determine that the patterns match.

When the processor 110 generates the next data access request after the artificial neural network memory controller 120 generates the advance data access request, the artificial neural network memory controller 120 may be configured to determine whether the advance data access request and the next data access request are the same requests.

According to the above-described configuration, the artificial neural network memory system 100 may detect the change of the artificial neural network data locality of the artificial neural network model which is processed by the processor 110. Accordingly, even though the artificial neural network model is changed, the artificial neural network memory controller 120 may analyze the changed artificial neural network data locality.

When the artificial neural network memory controller 120 determines that the advance data access request and the next data access request are the same requests, the artificial neural network memory controller 120 may be configured to maintain the artificial neural network data locality pattern.

According to the above-described configuration, the artificial neural network memory system 100 detects that the artificial neural network model processed by the processor 110 is repeatedly used, to more quickly prepare or provide data requested by the processor 110.

When the artificial neural network memory controller 120 determines that the advance data access request and the next data access request are different, the artificial neural network memory controller 120 may be configured to update the artificial neural network data locality pattern or further generate a new artificial neural network data locality pattern.

According to the above-described configuration, the artificial neural network memory system 100 may detect the change of the artificial neural network model which is processed by the processor 110 to generate an advance data access request corresponding to the changed artificial neural network model.

In some exemplary embodiments, the artificial neural network memory controller may be configured to generate continuous advance data access requests.

For example, when the data access request token is [2], an advance data access request which is generated by the artificial neural network memory controller may be a data access request corresponding to the token [3]. However, it is not limited thereto and, for example, the advance data access request generated by the artificial neural network memory controller may be a plurality of data access requests corresponding to tokens [3-4]. However, it is not limited thereto and, for example, the advance data access request generated by the artificial neural network memory controller may be a plurality of data access requests corresponding to tokens [3-4-5-6].

According to the above-described configuration, the artificial neural network memory controller may generate an advance data access request which predicts the entire order of the continuously repeated data access requests, based on the artificial neural network data locality pattern.

According to the above-described configuration, the artificial neural network memory controller may generate an advance data access request which predicts the order of at least some data access requests, based on the artificial neural network data locality pattern.

Figure 7:
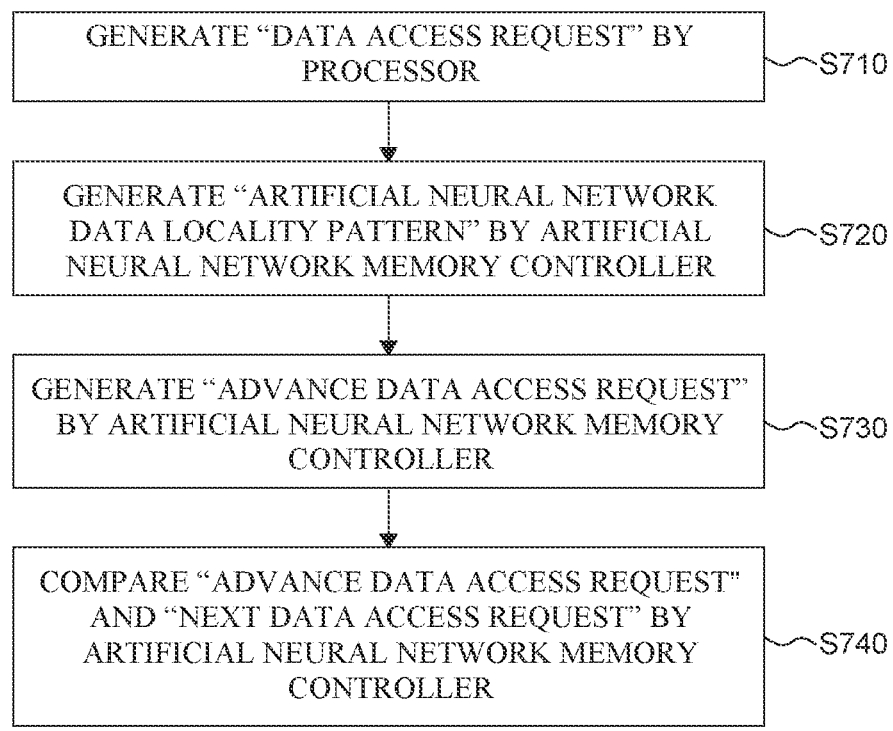
FIG. 7 is a flowchart for schematically explaining an operation of an artificial neural network memory controller according to an exemplary embodiment of the present disclosure.

FIG. 7 is a flowchart for schematically explaining an operation of an artificial neural network memory controller according to an exemplary embodiment of the present disclosure.

Referring to FIG. 7, for the artificial neural network operation processing, the processor 110 may be configured to generate a data access request corresponding to the artificial neural network model based on the artificial neural network data locality.

The artificial neural network memory controller 120 sequentially records the data access requests generated in the processor 110 to generate the artificial neural network data locality pattern (S710).

The artificial neural network memory controller 120 compares the generated artificial neural network data locality pattern and the data access request generated by the processor 110 to generate an advance data access request which predicts a next data access request to be generated by the processor 110.

The artificial neural network memory system 100 according to the exemplary embodiment of the present disclosure may be configured to include at least one processor 110 configured to generate a data access request corresponding to the artificial neural network operation and generate an artificial neural network data locality pattern of an artificial neural network operation by sequentially recording the data access request (S720). The artificial neural network memory system 100 may be configured to include at least one artificial neural network memory controller 120 configured to generate an advance data access request which predicts a next data access request of the data access request generated by at least one processor 110, based on the artificial neural network data locality pattern.

That is, at least one artificial neural network memory controller 120 generates an advance data access request before generating a next data access request (S730).

That is, at least one processor 110 is configured to transmit the data access request to at least one artificial neural network memory controller 120 and at least one artificial neural network memory controller 120 may be configured to output the advance data access request corresponding to the data access request.

The artificial neural network memory system 100 according to one exemplary embodiment of the present disclosure may be configured to include at least one processor 110 configured to generate a data access request corresponding to the artificial neural network operation and at least one artificial neural network memory controller 120 configured to generate an artificial neural network data locality pattern of an artificial neural network operation by sequentially recording the data access request generated by at least one processor 110 and to generate an advance data access request which predicts a next data access request of the data access request generated by at least one processor 110 based on the artificial neural network data locality pattern.

According to the above-described configuration, the artificial neural network memory controller 120 predicts a next data access request to be generated by the artificial neural network model, which is being processed by the processor 110 based on the artificial neural network data locality pattern, so that it is advantageous in that the corresponding data may be prepared in advance to be provided before the request of the processor 110.

The artificial neural network memory controller 120 may be configured to compare the generated advance data access request and a next data access request which is generated by the processor 110 after generating the advance data access request to determine whether the artificial neural network data locality pattern matches (S740).

According to the above-described configuration, the artificial neural network memory controller 120 generates the advance data access request before generating the next data access request to be prepared to provide the data in advance.

Accordingly, the artificial neural network memory controller 120 may substantially eliminate or reduce a latency which may be generated when the data is provided to the processor 110.

Figure 8:
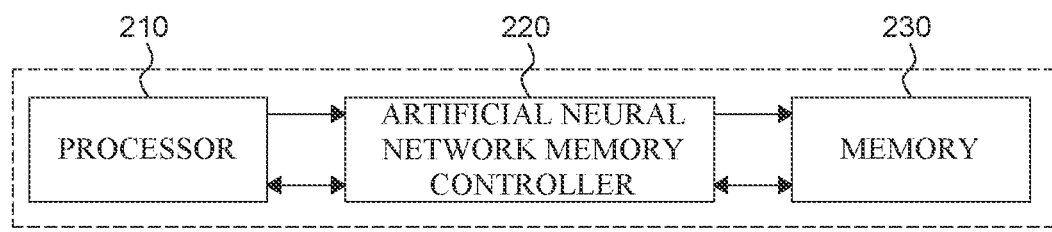
FIG. 8 is a schematic block diagram for explaining an artificial neural network memory system according to another exemplary embodiment of the present disclosure.

FIG. 8 is a schematic block diagram for explaining an artificial neural network memory system according to another exemplary embodiment of the present disclosure.

Referring to FIG. 8, an artificial neural network memory system 200 may be configured to include a processor 210, an artificial neural network memory controller 220, and a memory 230.

When the artificial neural network memory system 200 according to another exemplary embodiment of the present disclosure is compared with the artificial neural network memory system 100 according to one exemplary embodiment of the present disclosure, the artificial neural network memory system 200 and the artificial neural network memory system 100 are substantially the same except that the artificial neural network memory system 200 further includes the memory 230. Therefore, for the convenience of description, the redundant description will be omitted.

The artificial neural network memory system 200 according to another exemplary embodiment of the present disclosure includes the memory 230 configured to communicate with the artificial neural network memory controller 220 and the memory 230 may be configured to operate in accordance with the memory access request output from the artificial neural network memory controller 220.

The processor 210 may be configured to communicate with the artificial neural network memory controller 220. The processor 210 may be configured to generate a data access request to be transmitted to the artificial neural network memory controller 220. The data access request may be generated based on the artificial neural network data locality of the artificial neural network model which is being processed. The processor 210 is configured to be provided with the data corresponding to the data access request from the artificial neural network memory controller 220.

The artificial neural network memory controller 220 may be configured to receive the data access request generated by the processor 210. The artificial neural network memory controller 220 may be configured to generate an artificial neural network data locality pattern by analyzing the artificial neural network data locality of the artificial neural network model which is being processed by the processor 210.

The artificial neural network memory controller 220 may be configured to control the memory 230 by generating the memory access request. The artificial neural network memory controller 220 may be configured to generate the memory access request corresponding to the data access request. That is, the artificial neural network memory controller 220 may be configured to generate the memory access request corresponding to the data access request generated by the processor 210. For example, when the artificial neural network memory controller 220 does not generate the artificial neural network data locality pattern, the artificial neural network memory controller 220 may be configured to generate the memory access request based on the data access request generated by the processor 210. In this case, the memory access request may be configured to include the memory address value and the operation mode value among identification information included in the data access request.

The artificial neural network memory controller 220 may be configured to generate the memory access request corresponding to an advance data access request. That is, the artificial neural network memory controller 220 may be configured to generate the memory access request based on the advance data access request which is generated based on the artificial neural network data locality pattern. For example, when the artificial neural network memory controller 220 generates the artificial neural network data locality pattern, the artificial neural network memory controller 220 may be configured to generate the memory access request based on the advance data access request.

According to the above-described configuration, the artificial neural network memory controller 220 may transmit and receive data to and from the memory 230 by means of the memory access request and, when the memory access request is generated based on the advance data access request, the artificial neural network memory system 200 may more quickly provide the data to the processor 210.

The artificial neural network memory controller 220 may be configured to generate the memory access request based on one of the data access request generated by the processor 210 and the advance data access request generated by the artificial neural network memory controller 220. That is, the memory access request generated by the artificial neural network memory controller 220 may be selectively generated based on the data access request or the advance data access request.

The artificial neural network memory controller 220 may be configured to generate the memory access request including at least a part of identification information included in the data access request and the advance data access request. For example, the data access request generated by the processor 210 may include a memory address value and an operation mode value. At this time, the memory access request generated by the artificial neural network memory controller 220 may be configured to include a memory address value and an operation mode value of the corresponding data access request.

That is, each of the data access request, the advance data access request, and the memory access request may be configured to include the corresponding memory address value and operation mode value. The operation mode may be configured to include a read mode and a write mode. For example, the memory access request generated by the artificial neural network memory controller 220 may be configured to have a data type having the same configuration as the data access request or the advance data access request. Accordingly, from the viewpoint of the memory 230, even though the data access request and the advance data access request are not distinguished, the memory access request task may be performed in accordance with the instruction of the artificial neural network memory controller 220.

According to the above-described configuration, the memory 230 may operate regardless of whether the memory access request generated by the artificial neural network memory controller 220 is based on the data access request or based on the advance data access request. Accordingly, even though the artificial neural network memory controller 220 operates based on the artificial neural network data locality, the artificial neural network memory controller may operate to be compatible with various types of memories.

The artificial neural network memory controller 220 transmits the memory access request to the memory 230 and the memory 230 performs a memory operation corresponding to the memory access request.

The memory according to the exemplary embodiments of the present disclosure may be implemented in various forms. The memory may be implemented by a volatile memory and a non-volatile memory.

The volatile memory may include a dynamic RAM (DRAM) and a static RAM (SRAM). The non-volatile memory may include programmable ROM (PROM), an erasable PROM (EPROM), an electrically erasable PROM (EEPROM), a flash memory, a ferroelectric RAM (FRAM), a magnetic RAM (MRAM), and a phase change memory device (phase change RAM), but the present disclosure is not limited thereto.

The memory 230 may be configured to store at least one of inference data, weight data, and feature map data of the artificial neural network model which is being processed by the processor 210. The inference data may be an input signal of the artificial neural network model.

The memory 230 may be configured to receive a memory access request from the artificial neural network memory controller 220. The memory 230 may be configured to perform a memory operation corresponding to the received memory access request. The operation mode which controls the memory operation may include a read mode or a write mode.

For example, when the operation mode of the received memory access request is a write mode, the memory 230 may store the data received from the artificial neural network memory controller 220 in the corresponding memory address value.

For example, when the operation mode of the received memory access request is a read mode, the memory 230 may transmit the data stored in the corresponding memory address value to the artificial neural network memory controller 220. The artificial neural network memory controller 220 may be configured to transmit the received data to the processor 210 again.

The memory 230 may have a latency. The latency of the memory 230 may refer to a time which is delayed when the artificial neural network memory controller 220 processes the memory access request. That is, when the memory 230 receives the memory access request from the artificial neural network memory controller 220, actually requested data is output from the memory 230 after a latency of a specific clock cycle.

In order to process the memory access request, the memory 230 may access the memory address value included in the memory access request. Accordingly, a time to access the memory address value is necessary and the time may be defined as a memory latency. For example, a CAS latency of the DDR4 SDRM memory is approximately 10 ns. When the data is not provided to the processor 210 during the latency, the processor 210 is in an idle state so that the processor cannot perform an actual operation.

In addition, in the case of the DRAM which is one type of memory 230, a plurality of clocks is used to activate a word line and a bit line in accordance with a row address of the memory 230, a plurality of clocks is used to activate a column line, a plurality of clocks is used to allow the data to pass through a path through which the data is transmitted to the outside of the memory 230. Further, in the case of the NAND flash memory, units which are activated at one time are large, so that a plurality of clocks may be additionally used to search for data of a required address among them.

The memory 230 may have a bandwidth. A data transfer rate of the memory 230 may be defined as a memory bandwidth. For example, a bandwidth of the DDR4 SDRAM memory is approximately 4 GByte/sec. As the memory bandwidth is higher, the memory 230 may more quickly transmit data to the processor 210.

That is, the processing rate of the artificial neural network memory system 200 is affected by the latency generated when data to be processed by the processor 210 is provided and the bandwidth performance of the memory 230, more than the processing performance of the processor 210.

In other words, the bandwidth of the memory is gradually increased, but the latency of the memory is relatively slowly improved as compared with the improvement speed of the bandwidth. Specifically, whenever the memory access request is generated, the latency of the memory 230 is generated so that the frequent memory access request may be an important cause of the slow artificial neural network processing speed.

That is, even though the operation processing speed of the processor 210 is fast, if the latency is generated to take data necessary for the operation, the processor 210 may be in an idle state in which the operation is not performed. Therefore, in this case, the operation processing speed of the processor 210 may become slow.

Therefore, the artificial neural network memory system according to the exemplary embodiments of the present disclosure may be configured to improve the bandwidth and/or the latency of the memory 230.

Figure 9:
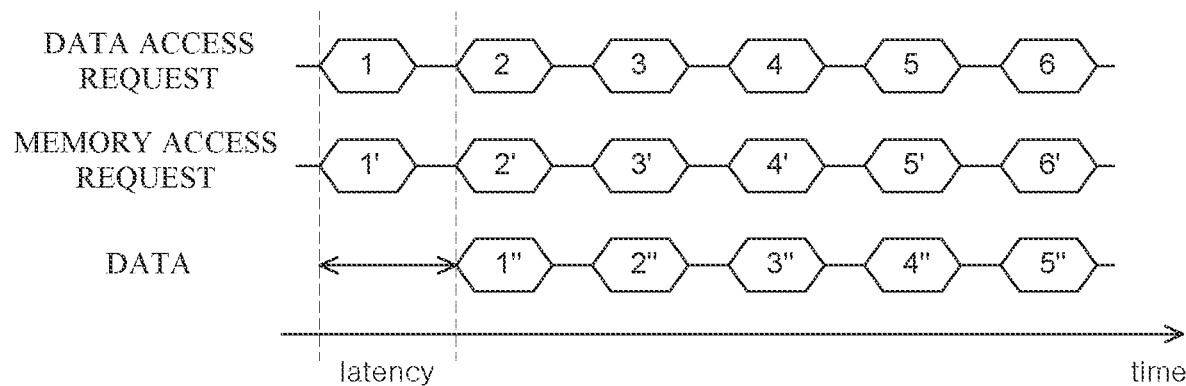
FIG. 9 is a schematic diagram for explaining an operation of a memory system according to a comparative embodiment of the present disclosure.

FIG. 9 is a schematic diagram for explaining an operation of a memory system according to a comparative embodiment of the present disclosure.

Referring to FIG. 9, the processor generates the data access request, and the memory system of the related art may transmit a memory access request corresponding to the data access request to the memory. At this time, the memory has a latency so that the processor may be provided with the requested data from the memory after waiting for a latency.

For example, the memory system of the related art receives a data access request [1] generated by the processor and transmits the memory access request [1'] corresponding to the data access request [1] to the memory. The memory may transmit the data [1"] to the memory system after the latency. Accordingly, a processing time of the processor may be delayed as much as the latency of the memory at every data access request. Accordingly, the time of the inference operation of the artificial neural network may be delayed as much as the memory latency. Specifically, as the processor generates more data access requests, the artificial neural network inference operation time of the memory system of the related art may be further delayed.

Figure 10:
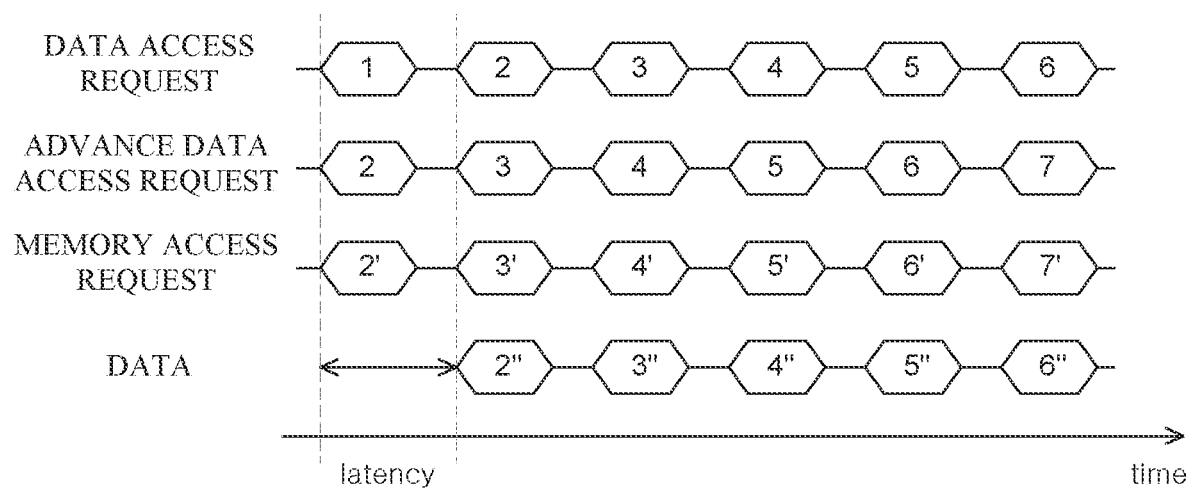
FIG. 10 is a schematic diagram for explaining a memory system according to another exemplary embodiment of the present disclosure.

FIG. 10 is a schematic diagram for explaining a memory system according to another exemplary embodiment of the present disclosure.

Referring to FIG. 10, the processor 210 generates a data access request [1] and the artificial neural network memory controller 220 may transmit the memory access request corresponding to the advance data access request generated based on the artificial neural network data locality pattern to the memory 230. At this time, even though the memory 230 has a latency, the processor 210 generates a memory access request corresponding to the advance data access request so that when the processor 210 generates the next data access request, the artificial neural network memory controller 220 may directly provide the data requested by the processor 210 to the processor 210.

For example, the data access request [1] generated by the processor 210 is received by the artificial neural network memory controller 220 to generate the advance data access request [2] and transmit the memory access request [2'] corresponding to the advance data access request [2] to the memory 230. The memory 230 may transmit the data [2"] to the artificial neural network memory controller 220 after the latency. However, the data [2"] provided by the memory 230 is data corresponding to the memory access request [2'] based on the advance data access request [2]. Accordingly, when the processor 210 generates the next data access request [2], the artificial neural network memory controller 220 may immediately provide the data [2"] to the processor 210.

If a time between the memory access request based on the advance data access request and the next data access request is longer than the latency of the memory 230, the artificial neural network memory controller 220 may provide the data to the processor 210 as soon as the next data access request is received from the processor 210. In this case, the artificial neural network memory controller 220 may substantially eliminate the latency of the memory 230.

In other words, when the memory access request based on the advance data access request is transmitted to the memory 230, the latency of the memory 230 may be shorter than or equal to a time from the generation of the advance data access request to the generation of the next data access request. In this case, the artificial neural network memory controller 220 may immediately provide data without causing the latency as soon as the processor 210 generates the next data access request.

Even though the time between the memory access request based on the advance data access request and the next data access request is shorter than the latency of the memory 230, the latency of the memory 230 may be substantially reduced as much as the time between the memory access request and the next data access request.

According to the above-described configuration, the artificial neural network memory controller 220 may substantially eliminate or reduce the latency of the data to be provided to the processor 210.

In some exemplary embodiments, the artificial neural network memory controller of the artificial neural network memory system may be configured to measure the latency of the memory or be provided with a latency value of the memory from the memory.

According to the above-described configuration, the artificial neural network memory controller may be configured to determine a timing of generating a memory access request based on the advance data access request, based on the latency of the memory. Accordingly, the artificial neural network memory controller may generate a memory access request based on the advance data access request which substantially minimizes the latency of the memory.

In some exemplary embodiments, the memory of the artificial neural network memory system may be a memory configured to include a refresh function which updates a voltage of a memory cell. The artificial neural network memory controller may be configured to selectively control the refresh to the memory address area of the memory corresponding to the memory access request corresponding to the advance data access request. For example, the memory may be a DRAM including a refresh function.

If the DRAM does not refresh the voltage of the memory cell, the memory cell is slowly discharged so that the stored data may be lost. Accordingly, the voltage of the memory cell needs to be refreshed at every specific cycle. If the timing of the memory access request of the artificial neural network memory controller and the refresh timing overlap, the artificial neural network memory system may be configured to advance or delay the timing of refreshing the voltage of the memory cell.

The artificial neural network memory system may predict or calculate the timing of generating the memory access request based on the artificial neural network data locality pattern. Accordingly, the artificial neural network memory system may be configured to limit the voltage refresh of the memory cell during the memory access request operation.

In other words, the inference operation of the artificial neural network operation operates with the concept of accuracy, so that even though the stored data is partially lost due to the delayed refresh of the voltage of the memory cell, the degradation of the inference accuracy may be substantially negligible.

According to the above-described configuration, the artificial neural network memory system may be provided with the data in accordance with the memory access request from the memory by adjusting the voltage refresh cycle of the memory cell. Accordingly, the operation speed lowering of the artificial neural network in accordance with the voltage refresh of the memory cell may be improved without substantially degrading the inference accuracy.

In some exemplary embodiments, the memory of the artificial neural network memory system may be configured to further include a precharge function which charges a global bit line of the memory with a specific voltage. At this time, the artificial neural network memory controller may be configured to selectively provide the precharge to the memory address area of the memory corresponding to the memory access request corresponding to the advance data access request.

In some exemplary embodiments, the artificial neural network memory controller may be configured to precharge or delay the bit line of the memory which performs a memory task corresponding to the advance data access request based on the artificial neural network data locality pattern.

Generally, the memory performs the precharge operation to perform a read operation or a write operation by receiving the memory access request. When one memory operation is completed, signals remain in the bit line which performs the data read and write operations and each data input/output line so that only when the above-mentioned lines are precharged to a predetermined level, a subsequent memory operation may be smoothly performed. However, since the time required for precharge is quite long, when the timing of generating a memory access request and the timing of precharge overlap, the memory operation may be delayed by the precharge time. Accordingly, the time for processing the data access request requested by the processor may be delayed.

The artificial neural network memory controller may predict that a memory operation is performed on a bit line of a specific memory at a specific order based on the artificial neural network data locality pattern. Accordingly, the artificial neural network memory controller may advance or delay the precharge timing so as not to overlap the precharge timing and a time when the memory operation is performed on a specific bit line.

In other words, the inference operation of the artificial neural network model operates with the concept of accuracy, so that even though the stored data is partially lost due to the delayed precharge, the degradation of the inference accuracy may be substantially negligible.

In other words, the artificial neural network is a mathematical model modeled by simulating a brain neural network of a biological system. A human nerve cell called a neuron exchanges information through a junction between nerve cells called synapses and the information exchange between the nerve cells is very simple, but a massive number of nerve cells are gathered to create the intelligence. This structure has advantages in that, even though some nerve cells transmit wrong information, it does not affect the overall information so that it is very robust against small errors. Therefore, due to the above-described characteristic, even though the precharge and refresh functions of the memory which stores the data of the artificial neural network model are selectively limited, the accuracy of the artificial neural network model may not substantially cause problems and the memory latency due to the precharge or the refresh may be reduced.

According to the above-described configuration, the operation speed lowering of the artificial neural network in accordance with the precharge may be improved without substantially degrading the inference accuracy.

In some exemplary embodiments, the artificial neural network memory controller may be configured to independently control the refresh function and the precharge function of the memory based on the artificial neural network data locality pattern.

Figure 11:
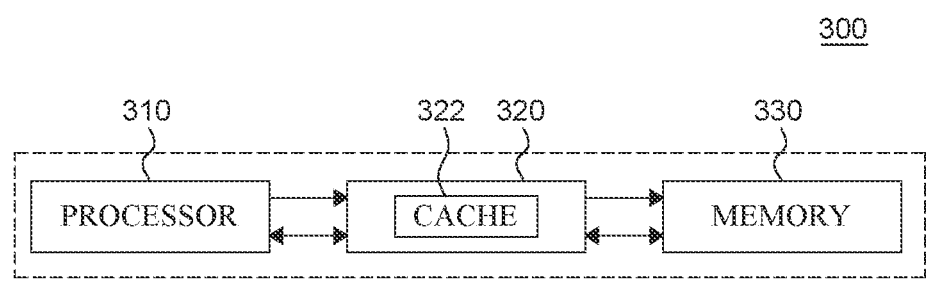
FIG. 11 is a schematic block diagram for explaining an artificial neural network memory system according to still another exemplary embodiment of the present disclosure.

FIG. 11 is a schematic block diagram for explaining an artificial neural network memory system according to still another exemplary embodiment of the present disclosure.

Referring to FIG. 11, an artificial neural network memory system 300 may be configured to include a processor 310, an artificial neural network memory controller 320 including a cache memory 322, and a memory 330.

When the artificial neural network memory system 300 according to still another exemplary embodiment of the present disclosure is compared with the artificial neural network memory system 200 according to another exemplary embodiment of the present disclosure, the artificial neural network memory system 300 and the artificial neural network memory system 200 are substantially the same except that the artificial neural network memory system 300 further includes the cache memory 322. Therefore, for the convenience of description, the redundant description will be omitted.

The artificial neural network memory system 300 according to still another exemplary embodiment of the present disclosure may be configured to include an artificial neural network memory controller 320 including a cache memory 322 configured to store data transmitted by the memory 330 in response to a memory access request based on an advance data access request.

According to the above-described configuration, the artificial neural network memory controller 320 may read data in response to the memory access request based on the advance data access request from the memory 330 and store the data in the cache memory 322. Therefore, when the processor 310 generates a next data access request, the artificial neural network memory controller 320 may immediately provide the data stored in the cache memory 322 to the processor 310.

A latency of the cache memory 322 is much shorter than the latency of the memory 330. A bandwidth of the cache memory 322 is higher than the bandwidth of the memory 330.

An artificial neural network model processing performance of the artificial neural network memory system 300 including a cache memory 322 according to still another exemplary embodiment of the present disclosure may be better than the artificial neural network memory system 200 according to another exemplary embodiment of the present disclosure.

The artificial neural network memory system 300 according to still another exemplary embodiment of the present disclosure will be described with reference to the artificial neural network model 1300 of FIG. 3.

The artificial neural network model 1300 may be compiled by a specific compiler to be operated in the processor 310. The compiler may be configured to provide the artificial neural network data locality pattern to the artificial neural network memory controller 320.

In order to infer the artificial neural network model 1300, the processor 310 may be configured to generate data access requests according to the order based on the artificial neural network data locality. Accordingly, the artificial neural network memory controller 320 may monitor the data access requests to generate the artificial neural network data locality pattern 1400. Alternatively, the artificial neural network memory controller 320 may store an artificial neural network data locality pattern 1400 which has been generated in advance.

Hereinafter, an example in which an artificial neural network data locality pattern 1400 is not generated will be described.

First, the processor 310 may generate a data access request of a token [1] corresponding to a node value read mode of the input layer 1310. Accordingly, the artificial neural network memory controller 320 generates the memory access request of the token [1] to transmit the node value of the input layer 1310 which is transmitted from the memory 330 to the processor 310.

Next, the processor 310 may generate a data access request of a token [2] corresponding to a weight value of the first connection network 1320. Accordingly, the artificial neural network memory controller 320 generates the memory access request of the token [2] to transmit the weight value of the first connection network 1320 which is transmitted from the memory 330 to the processor 310.

Next, the processor 310 receives the node value of the input layer 1310 and the weight value of the first connection network 1320 to calculate the node value of the first hidden layer 1330. That is, the processor 310 may generate a data access request of a token [3] corresponding to a node value write mode of the first hidden layer 1330. Accordingly, the artificial neural network memory controller 320 generates the memory access request of the token [3] to store the node value of the first hidden layer 1330 in the memory 330.

Next, the processor 310 may generate a data access request of a token [4] corresponding to anode value read mode of the first hidden layer 1330. Accordingly, the artificial neural network memory controller 320 generates the memory access request of the token [4] to transmit the node value of the first hidden layer 1330 which is transmitted from the memory 330 to the processor 310.

Next, the processor 310 may generate a data access request of a token [5] corresponding to a weight value of the second connection network 1340. Accordingly, the artificial neural network memory controller 320 generates the memory access request of the token [5] to transmit the weight value of the second connection network 1340 which is transmitted from the memory 330 to the processor 310.

Next, the processor 310 receives the node value of the first hidden layer 1330 and the weight value of the second connection network 1340 to calculate the node value of the second hidden layer 1350. That is, the processor 310 may generate a data access request of a token [6] corresponding to a node value write mode of the second hidden layer 1350. Accordingly, the artificial neural network memory controller 320 generates the memory access request of the token [6] to store the node value of the second hidden layer 1350 in the memory 330.

Next, the processor 310 may generate a data access request of a token [7] corresponding to a node value read mode of the second hidden layer 1350. Accordingly, the artificial neural network memory controller 320 generates the memory access request of the token [7] to transmit the node value of the second hidden layer 1350 which is transmitted from the memory 330 to the processor 310.

Next, the processor 310 may generate a data access request of a token [8] corresponding to a weight value of the third connection network 1360. Accordingly, the artificial neural network memory controller 320 generates the memory access request of the token [8] to transmit the weight value of the third connection network 1360 which is transmitted from the memory 330 to the processor 310.

Next, the processor 310 receives the node value of the second hidden layer 1350 and the weight value of the third connection network 1360 to calculate the node value of the output layer 1370. That is, the processor 310 may generate a data access request of a token [9] corresponding to a node value write mode of the output layer 1370. Accordingly, the artificial neural network memory controller 320 generates the memory access request of the token [9] to store the node value of the output layer 1370 in the memory 330.

Accordingly, the artificial neural network memory system 300 may store the inference result of the artificial neural network model 1300 in the output layer 1370.

In the above-described example, the artificial neural network data locality pattern 1400 has not been generated in the artificial neural network memory controller 320. Therefore, according to the above-described example, the advance data access request cannot be generated. Accordingly, since the artificial neural network memory controller 320 does not provide the data in advance, the latency of the memory 330 may be caused in every memory access request.

However, since the artificial neural network memory controller 320 records the data access requests, when the processor 310 generates the data access request of the token [1] corresponding to a node value read mode of the input layer 1310 again, the artificial neural network data locality pattern 1400 may be generated.

Hereinafter, it is described that the artificial neural network data locality pattern 1400 is generated with reference to FIG. 4 again.

In the following example, the artificial neural network data locality pattern 1400 is generated and the processor 310 is repeatedly inferring the artificial neural network model 1300, but it is not limited thereto.

The processor 310 detects the repeated data access request of the token [1] to generate the artificial neural network data locality pattern 1400. In other words, since the artificial neural network memory controller 320 sequentially stores from the token [1] to the token [9], when the artificial neural network memory controller 320 detects the token [1] again, the artificial neural network data locality may be determined.

However, as described above, the artificial neural network memory controller according to the exemplary embodiments of the present disclosure is not limited to the token. The token is merely used for the convenience of description and the exemplary embodiments of the present disclosure may be implemented by the identification information included in the data access request and the memory access request.

For example, when the processor 310 generates the data access request corresponding to the token [9], the artificial neural network memory controller 320 generates the advance data access request of the token [1]. Accordingly, the artificial neural network memory controller 320 generates the memory access request of the token [1] to store the node value of the input layer 1310 in the cache memory 322 in advance.

That is, if the data access request of the token [9] is the last step of the artificial neural network model 1300, the artificial neural network memory controller 320 may predict that the data access request of the token [1] which is a start step of the artificial neural network model 1300 will be generated.

Next, when the processor 310 generates a data access request of the token [1], the artificial neural network memory controller 320 determines whether the advance data access request of the token [1] and the data access request of the token [1] are the same. When it is determined that the requests are the same, the node value of the input layer 1310 stored in the cache memory 322 may be immediately provided to the processor 310.

At this time, the artificial neural network memory controller 320 generates the advance data access request of the token [2].

Accordingly, the artificial neural network memory controller 320 generates the memory access request of the token [2] to store the weight value of the first connection network 1320 in the cache memory 322 in advance.

Next, when the processor 310 generates a data access request of the token [2], the artificial neural network memory controller 320 determines whether the advance data access request of the token [2] and the data access request of the token [2] are the same. When it is determined that the requests are the same, the node value of the first connection network 1320 stored in the cache memory 322 may be immediately provided to the processor 310.

At this time, the artificial neural network memory controller 320 generates the advance data access request of the token [3].

Next, the processor 310 receives the node value of the input layer 1310 and the weight value of the first connection network 1320 to calculate the node value of the first hidden layer 1330. When the processor 310 generates a data access request of the token [3], the artificial neural network memory controller 320 determines whether the advance data access request of the token [3] and the data access request of the token [3] are the same. When it is determined that the requests are the same, the calculated node value of the first hidden layer 1330 may be stored in the memory 330 and/or the cache memory 322.

The cache memory 322 will be additionally described. When the same data is stored in the memory 330 as the memory access request of the token [3] without having the cache memory 322, and then is read from the memory 330 as the memory access request of the token [4], the latency of the memory 330 may be doubled.

In this case, the artificial neural network memory controller 320 stores the node value of the layer calculated based on the fact that the memory address values of continuous tokens are the same and an operation mode of a previous token is a write mode, and an operation mode of the subsequent token is a read mode and determines to use the corresponding node value as an input value of a subsequent layer.

That is, when the data of the token [3] is stored in the cache memory 322, the data access requests corresponding to the token [3] and the token [4] may be processed in the cache memory 322. Accordingly, the artificial neural network memory controller 320 may be configured so as not to generate the memory access requests corresponding to the data access request of the token [3] and the data access request of the token [4]. According to the above-described configuration, the latency of the memory 330 by the memory 330 may be eliminated by the memory access request of the token [3] and the memory access request of the token [4]. In particular, the cache memory 322 operation policy may be performed based on the artificial neural network data locality pattern 1400.

At this time, the artificial neural network memory controller 320 generates the advance data access request of the token [4].

Next, when the processor 310 generates a data access request of the token [4], the artificial neural network memory controller 320 determines whether the advance data access request of the token [4] and the data access request of the token [4] are the same. When it is determined that the requests are the same, the node value of the first hidden layer 1330 stored in the cache memory 322 may be immediately provided to the processor 310.

At this time, the artificial neural network memory controller 320 generates the advance data access request of the token [5].

Accordingly, the artificial neural network memory controller 320 generates the memory access request of the token [5] to store the weight value of the second connection network 1340 in the cache memory 322 in advance.

Next, when the processor 310 generates a data access request of the token [5], the artificial neural network memory controller 320 determines whether the advance data access request of the token [5] and the data access request of the token [5] are the same. When it is determined that the requests are the same, the weight value of the second connection network 1340 stored in the cache memory 322 may be immediately provided to the processor 310.

At this time, the artificial neural network memory controller 320 generates the advance data access request of the token [6].

Next, the processor 310 receives the node value of the first hidden layer 1330 and the weight value of the second connection network 1340 to calculate the node value of the second hidden layer 1350. When the processor 310 generates a data access request of the token [6], the artificial neural network memory controller 320 determines whether the advance data access request of the token [6] and the data access request of the token [6] are the same. When it is determined that the requests are the same, the calculated node value of the second hidden layer 1350 may be stored in the memory 330 and/or the cache memory 322.

At this time, the artificial neural network memory controller 320 generates the advance data access request of the token [7].

Next, when the processor 310 generates a data access request of the token [7], the artificial neural network memory controller 320 determines whether the advance data access request of the token [7] and the data access request of the token [7] are the same. When it is determined that the requests are the same, the node value of the second hidden layer 1350 stored in the cache memory 322 may be immediately provided to the processor 310.

At this time, the artificial neural network memory controller 320 generates the advance data access request of the token [8].

Accordingly, the artificial neural network memory controller 320 generates the memory access request of the token [8] to store the weight value of the third connection network 1360 in the cache memory 322 in advance.

Next, when the processor 310 generates a data access request of the token [8], the artificial neural network memory controller 320 determines whether the advance data access request of the token [8] and the data access request of the token [8] are the same. When it is determined that the requests are the same, the weight value of the third connection network 1360 stored in the cache memory 322 may be immediately provided to the processor 310.

At this time, the artificial neural network memory controller 320 generates the advance data access request of the token [9].

Next, the processor 310 receives the node value of the second hidden layer 1350 and the weight value of the third connection network 1360 to calculate the node value of the output layer 1370. When the processor 310 generates a data access request of the token [9], the artificial neural network memory controller 320 determines whether the advance data access request of the token [9] and the data access request of the token [9] are the same. When it is determined that the requests are the same, the calculated node value of the output layer 1370 may be stored in the memory 330 and/or the cache memory 322.

Accordingly, the artificial neural network memory system 300 may store the inference result of the artificial neural network model 1300 in the output layer 1370.

Even though the inference of the artificial neural network model 1300 ends by the artificial neural network data locality pattern 1400, the artificial neural network memory system 300 may be prepared to immediately start the next inference.

That is, the artificial neural network memory system 300 according to still another exemplary embodiment of the present disclosure may be configured to generate an advance data access request based on the artificial neural network data locality, determine whether the advance data access request and an actual data access request are the same, and if the requests are the same, further generate a next advance data access request. According to the above-described configuration, the artificial neural network memory controller 320 may eliminate or reduce the latency of the memory 330 at the time of processing the data access request.

In some exemplary embodiments, the artificial neural network memory controller may be configured to operate to minimize an available space of the cache memory by generating at least one advance data access request.

That is, the artificial neural network memory controller compares the memory available space of the cache memory and a size of the data value to be stored and when the memory available space of the cache memory is present, generates at least one advance data access request to minimize the available space of the cache memory.

That is, the artificial neural network memory controller may be configured to generate a plurality of advance data access requests in accordance with a capacity of the cache memory.

That is, the artificial neural network memory controller may be configured to sequentially generate at least one memory access request based on a remaining capacity of the cache memory to minimize the remaining capacity of the cache memory.

The example will be described with reference to FIGS. 2 to 6. When the processor generates a data access request of the token [1], the artificial neural network memory controller generates an advance data access request of the token [2] to store the weight value of the first connection network 1320 in the cache memory in advance. Next, the artificial neural network memory controller may allocate a space for storing and reading the node value calculating result of the first hidden layer 1330 corresponding to the token [3] and the token [4] to the cache memory in advance. Next, the artificial neural network memory controller may store the weight value of the second connection network 1340 corresponding to the token [5] in the cache memory in advance. When there is a margin in the cache memory, the artificial neural network memory controller may be configured to further generate sequentially the advance data access request based on the artificial neural network data locality pattern. That is, when there is a margin in the capacity of the cache memory, the artificial neural network memory controller may be configured to store weight values in the cache memory in advance based on the artificial neural network data locality pattern or ensure an area to store the artificial neural network operation result in advance.

If the capacity of the cache memory is sufficient, weight values of all connection networks of the artificial neural network model 1300 may be stored in the cache memory. Specifically, in the case of the artificial neural network model which completes the learning, the weight values are fixed. Accordingly, when the weight values reside in the cache memory, the latency of the memory caused by the memory access request to read the weight values may be eliminated.

According to the above-described configuration, the data required for the cache memory is stored based on the artificial neural network data locality to optimize an operational efficiency of the cache memory and improve the processing speed of the artificial neural network memory system 300.

According to the above-described configuration, the cache memory sequentially generates the advance data access request in consideration of both the artificial neural network data locality pattern and the capacity of the cache memory so that the processing speed of the artificial neural network memory system may be improved.

According to the above-described configuration, when the processor generates a specific data access request included in the artificial neural network data locality pattern 1400, the artificial neural network memory controller may sequentially predict at least one data access request after the specific data access request. For example, when the processor generates the data access request of the token [1], the artificial neural network memory controller may predict that corresponding data access requests are generated in the order of tokens [2-3-4-5-6-7-8-9].

According to the above-described configuration, the artificial neural network memory controller 320 may cause the specific weight values to reside in the cache memory for a specific period. For example, when the processor infers at a speed of 30 times per second by utilizing the artificial neural network model, the weight value of the specific layer may reside in the cache memory. In this case, the artificial neural network memory controller may reutilize the weight value stored in the cache memory for every inference. Accordingly, the corresponding memory access request may be selectively deleted. Accordingly, the latency in accordance with the memory access request may be eliminated.

In some exemplary embodiments, the cache memory may be configured by a plurality of layered cache memories. For example, the cache memory may include a cache memory configured to store the weight value or a cache memory configured to store a feature map.

In some exemplary embodiments, when the artificial neural network data locality pattern 1400 is generated, the artificial neural network memory controller may be configured to predict the weight value and the node value based on the identification information included in the data access request. Accordingly, the artificial neural network memory controller may be configured to identify the data access request corresponding to the weight value. Specifically, when it is assumed that the learning is completed so that a weight value of the connection network is fixed, in the artificial neural network data locality pattern 1400, the weight value may be configured to operate only in the read mode. Accordingly, the artificial neural network memory controller may determine the token [2], the token [5], and the token [8] as weight values. In other words, the token [1] is a start step of the inference so that it may be determined as an input node value. In other words, the token [9] is a last step of the inference so that it may be determined as an output node value. In other words, the tokens [3] and [4] have orders of the write mode and the read mode of the same memory address value so that the tokens [3] and [4] may be determined as a node value of the hidden layer. However, it may vary depending on the artificial neural network data locality of the artificial neural network model.

The artificial neural network memory controller may be configured to analyze the artificial neural network data locality pattern to determine whether the data access request is a weight value, a kernel window value, a node value, an activation map value, or the like of the artificial neural network model.

In some exemplary embodiments, the artificial neural network memory system includes a processor configured to generate a data request corresponding to the artificial neural network operation, an artificial neural network memory controller configured to store an artificial neural network data locality pattern generated by a compiler and generate an advance data access request, which predicts a next data access request of the data access request generated by the processor based on the artificial neural network data locality pattern; and a memory configured to communicate with the artificial neural network memory controller. The memory may be configured to operate in accordance with the memory access request output from the artificial neural network memory controller.

According to the above-described configuration, the artificial neural network memory controller may be configured to be provided with the artificial neural network data locality pattern generated from the compiler. In this case, the artificial neural network memory controller may allow the data access requests of the artificial neural network model which is being processed by the processor to be prepared in the cache memory in advance based on the artificial neural network data locality pattern generated by the compiler. Specifically, the artificial neural network data locality pattern generated by the compiler may be more accurate than the artificial neural network data locality pattern generated by monitoring the artificial neural network data locality.

In other words, the artificial neural network memory controller may be configured to respectively store the artificial neural network data locality pattern generated by the compiler and the artificial neural network data locality pattern generated by independently monitoring the data access request.

FIG. 12 is a schematic diagram for explaining exemplary identification information of a data access request.

A data access request generated by a processor according to the exemplary embodiments of the present disclosure may be configured to further include at least one piece of additional identification information. The additional identification information may also be referred to as a side band signal or side band information.

A data access request generated by the processor may be an interface signal with a specific structure. That is, the data access request may be an interface signal for the communication of the processor and the artificial neural network memory controller. The data access request may be configured to further include an additional bit to additionally provide identification information required for the artificial neural network operation, but the present disclosure is not limited thereto, and the additional identification information may be provided in various ways.

In some exemplary embodiments, the data access request of the artificial neural network memory system may be configured to further include identification information to identify whether it is an artificial neural network operation, but the exemplary embodiments of the present disclosure are not limited thereto.

For example, the artificial neural network memory system adds one bit of identification code to the data access request to identify whether the data access requests received by the artificial neural network memory controller is a data access request related to the artificial neural network operation. However, the number of bits of the identification code according to the exemplary embodiments of the present disclosure is not limited and may be adjusted in accordance with the number of cases of an object to be identified.

For example, when the identification code is [0], the artificial neural network memory controller may determine that the corresponding data access request is related to the artificial neural network operation.

For example, when the identification code is [1], the artificial neural network memory controller may determine that the corresponding data access request is not related to the artificial neural network operation.

In this case, the artificial neural network memory controller may be configured to generate the artificial neural network data locality pattern by recording only the data access request related to the artificial neural network operation based on the identification information included in the data access request. According to the above-described configuration, the artificial neural network memory controller may not record the data access request which is not related to the artificial neural network operation. By doing this, the accuracy of the artificial neural network data locality pattern generated by recording the data access requests may be improved, but the exemplary embodiments of the present disclosure are not limited thereto.

In some exemplary embodiments, the data access request of the artificial neural network memory system may be configured to further include identification information to identify whether the artificial neural network operation is an operation for learning or an operation for inference, but the exemplary embodiments of the present disclosure are not limited thereto.

For example, the artificial neural network memory system adds one bit of identification code to the data access request so that the data access requests received by the artificial neural network memory controller are configured to identify whether an operation type of the artificial neural network model is learning or inference. However, the number of bits of the identification code according to the exemplary embodiments of the present disclosure is not limited and may be adjusted in accordance with the number of cases of an object to be identified.

For example, when the identification code is [0], the artificial neural network memory controller may determine that the corresponding data access request is a learning operation.

For example, when the identification code is [1], the artificial neural network memory controller may determine that the corresponding data access request is an inference operation.

In this case, the artificial neural network memory controller may be configured to generate the artificial neural network data locality pattern by individually recording the data access request of the learning operation and the data access request of the inference operation. For example, in the learning mode, an evaluation step of updating each layer of the artificial neural network model and/or the weight values of the kernel window and determining an inference accuracy of the trained artificial neural network model may be further included. Accordingly, even though the structures of the artificial neural network models are the same, the artificial neural network data locality to be processed by the processor may be different in the learning operation and the inference operation.

According to the above-described configuration, the artificial neural network memory controller may be configured to separately generate the artificial neural network data locality pattern of the learning mode and the artificial neural network data locality pattern of the inference mode of the specific artificial neural network model. By doing this, the accuracy of the artificial neural network data locality pattern generated by recording the data access requests by the artificial neural network memory controller may be improved, but the exemplary embodiments of the present disclosure are not limited thereto.

In some exemplary embodiments, the data access request of the artificial neural network memory system may be configured with an operation mode including identification information to identify the memory read operation and the memory write operation, but not limited thereto, so that the data access request of the artificial neural network memory system may be configured with an operation mode which further includes the identification information to identify the overwrite operation and/or protective operation, but the exemplary embodiments of the present disclosure are not limited thereto.

For example, one bit of identification code is added to the data access request of the artificial neural network memory system to include the read operation and the write operation. Alternatively, two bits of identification code are added to the data access request of the artificial intelligence network memory system to identify the read operation, the write operation, the overwrite operation, and the protective operation. However, the number of bits of the identification code according to the exemplary embodiments of the present disclosure is not limited and may be adjusted in accordance with the number of cases of an object to be identified.

In other words, for the operation of the artificial neural network memory system, the data access request needs to include identification information to identify the memory address value and the read operation, and the write operation. The artificial neural network memory controller receives the data access request to generate a corresponding memory access request to perform the memory operation.

For example, when the identification code is [00], the artificial neural network memory controller may determine the corresponding data access request as a read operation.

For example, when the identification code is [01], the artificial neural network memory controller may determine the corresponding data access request as a write operation.

For example, when the identification code is [10], the artificial neural network memory controller may determine the corresponding data access request as an overwrite operation.

For example, when the identification code is [11], the artificial neural network memory controller may determine the corresponding data access request as a protective operation.

However, the exemplary embodiments of the present disclosure are not limited thereto.

According to the above-described configuration, the artificial neural network memory controller controls the memory in accordance with the read mode or the write mode to be provided with various data of the artificial neural network model or store the data in the memory.

According to the above-described configuration, the artificial neural network memory controller may update the weight value of the specific layer by the overwrite mode during the learning operation of the artificial neural network. Specifically, the updated weight value is stored in the same memory address value so that a new memory address may not be allocated. Accordingly, the overwrite mode may be more effective than the write mode during the learning operation.

According to the above-described configuration, the artificial neural network memory controller may protect data stored in the specific memory address by a protective mode. Specifically, in an environment in which a plurality of users are accessing, like ae server, the data of the artificial neural network model may not be arbitrarily eliminated. Further, the weight values of the artificial neural network model which ends the learning may be protected with the protective mode.

In some exemplary embodiments, the data access request of the artificial neural network memory system may be configured to further include identification information capable of identifying inference data, a weight, a feature map, a learning data set, an evaluation data set, and others, but the exemplary embodiments of the present disclosure are not limited thereto.

For example, the artificial neural network memory system may be configured to add 3 bits of identification code to the data access request to allow the artificial neural network memory controller to identify a domain of the data to access. However, the number of bits of the identification code according to the exemplary embodiments of the present disclosure is not limited and may be adjusted in accordance with the number of cases of an object to be identified.

For example, when the identification code is [000], the artificial neural network memory controller may determine that the corresponding data is data which is not related to the artificial neural network model.

For example, when the identification code is [001], the artificial neural network memory controller may determine that the corresponding data is the inference data of the artificial neural network model.

For example, when the identification code is [010], the artificial neural network memory controller may determine that the corresponding data is the feature map of the artificial neural network model.

For example, when the identification code is [011], the artificial neural network memory controller may determine that the corresponding data is the weight of the artificial neural network model.

For example, when the identification code is [100], the artificial neural network memory controller may determine that the corresponding data is the learning data set of the artificial neural network model.

For example, when the identification code is [101], the artificial neural network memory controller may determine that the corresponding data is the inference data set of the artificial neural network model.

According to the above-described configuration, the artificial neural network memory controller may be configured to identify the domain of the data of the artificial neural network model and to allocate an address of a memory in which data corresponding to the domain is stored. For example, the artificial neural network memory controller may set a starting address and the end address of the memory area allocated to the domain. According to the above-described configuration, the data allocated to the domain may be stored to correspond to the order of the artificial neural network data locality pattern.

For example, data of the domain of the artificial neural network model may be sequentially stored in the memory area allocated to the domain. At this time, the memory may be a memory which supports a read-burst function. According to the above-described configuration, when the artificial neural network memory controller reads data of a specific domain from the memory, the specific data may be configured to be stored in accordance with the artificial neural network data locality pattern to be optimized for the read-burst function. That is, the artificial neural network memory controller may be configured to set the storage area of the memory in consideration of the read-burst function.

In some exemplary embodiments, the memory further includes a read-burst function and at least one artificial neural network memory controller may be configured to write the storage area of at least one memory in consideration of the read-burst function.

In some exemplary embodiments, the data access request of the artificial neural network memory system may be configured to further include identification information to identify the quantization of the artificial neural network model, but the exemplary embodiments of the present disclosure are not limited thereto.

For example, when the data access request includes at least the memory address value, the domain, and the quantization identification information, the artificial neural network memory system may be configured to identify the quantization information of the data of the domain.

For example, when the identification code is [00001], the artificial neural network memory controller may determine that the corresponding data is data quantized to one bit.

For example, when the identification code is [11111], the artificial neural network memory controller may determine that the corresponding data is data quantized to 32 bits.

In some exemplary embodiments, various identification information may be selectively included in the data access request.

According to the above-described configuration, the artificial neural network memory controller analyzes the identification code of the data access request to generate a more accurate artificial neural network data locality pattern. Further, each identification information is figured out to selectively control the storage policy of the memory.

For example, when the learning and the inference are identified, each artificial neural network data locality pattern may be generated.

For example, when the domain of the data is identified, a policy of storing the data of the artificial neural network data locality pattern in a specific memory area is established to improve the efficiency of the memory operation.

In some exemplary embodiments, when the artificial neural network memory system is configured to process a plurality of artificial neural network models, the artificial neural network memory controller may be configured to further generate identification information of the artificial neural network model, for example, additional identification information, such as a first artificial neural network model or a second artificial neural network model. At this time, the artificial neural network memory controller may be configured to distinguish the artificial neural network model based on the artificial neural network data locality of the artificial neural network model, but it is not limited thereto.

Figure 13:
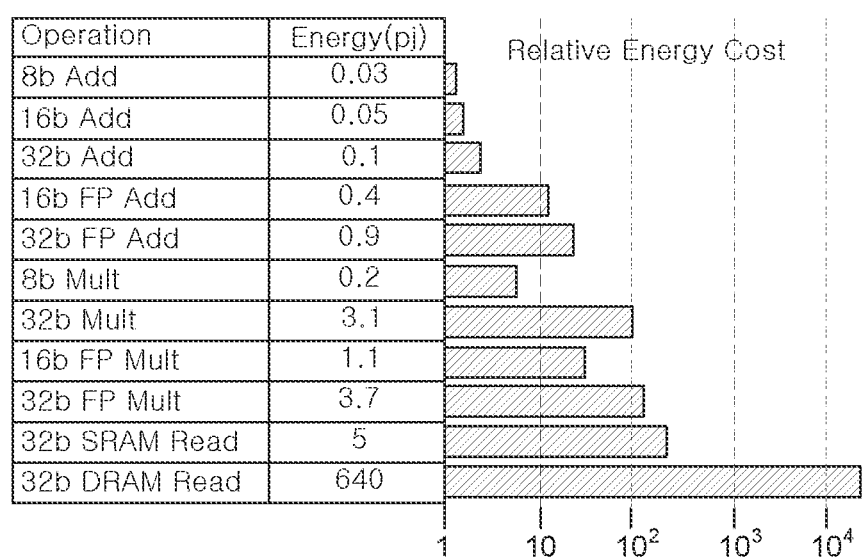
FIG. 13 is a schematic diagram for explaining energy consumption per unit operation of an artificial neural network memory system.

FIG. 13 is a schematic diagram for explaining energy consumption per unit operation of an artificial neural network memory system.

Referring to FIG. 13, in a table, an energy consumed per unit operation of the artificial neural network memory system 300 is schematically explained. The energy consumption may be explained to be divided into a memory access, an addition operation, and a multiplication operation.

"8b Add" refers to 8-bit integer addition operation of an adder. The 8 bit integer addition operation may consume energy of 0.03 pj.

"16b Add" refers to 16-bit integer addition operation of an adder. The 16 bit integer addition operation may consume energy of 0.05 pj.

"32b Add" refers to 32-bit integer addition operation of an adder. The 32 bit integer addition operation may consume energy of 0.1 pj.

"16b FP Add" refers to 16-bit floating point addition operation of an adder. The 16 bit floating point addition operation may consume energy of 0.4 pj.

"32b FP Add" refers to 32-bit floating point addition operation of an adder. The 32 bit floating point addition operation may consume energy of 0.9 pj.

"8b Mult" refers to 8-bit integer multiplication operation of a multiplier. The 8 bit integer multiplication operation may consume energy of 0.2 pj.

"32b Mult" refers to 32-bit integer multiplication operation of a multiplier. The 32 bit integer multiplication operation may consume energy of 3.1 pj.

"16b FP Mult" refers to 16-bit floating point multiplication operation of a multiplier. The 16 bit floating point multiplication operation may consume energy of 1.1 pj.

"32b FP Mult" refers to 32-bit floating point multiplication operation of a multiplier. The 32 bit floating point multiplication operation may consume energy of 3.7 pj.

"32b SRAM Read' refers to 32-bit data read access when the cache memory 322 of the artificial neural network memory system 300 is a static random access memory (SRAM). An energy of 5 pj may be consumed to read 32 bits of data from the cache memory 322 to the processor 310.

"32b DRAM Read' refers to 32-bit data read access when the memory 330 of the artificial neural network memory system 300 is a DRAM. An energy of 640 pj may be consumed to read 32 bits of data from the memory 330 to the processor 310. The energy unit refers to picojoules (pj).

When the 32-bit floating point multiplication and 8-bit integer multiplication which are performed by the artificial neural network memory system 300 are compared, the difference in the energy consumed per unit operation is approximately 18.5 times. When 32-bit data is read from the memory 330 configured by the DRAM and 32-bit data is read from the cache memory 322 configured by the SRAM, the difference in the energy consumed per unit operation is approximately 128 times.

That is, from the viewpoint of the power consumption, the larger the bit size of the data, the more the power consumption. Further, when the floating point operation is used, the power consumption is increased more than the integer operation. Further, when the data is read from the DRAM, the power consumption is rapidly increased.

In the artificial neural network memory system 300 according to still another exemplary embodiment of the present disclosure, a capacity of the cache memory 322 may be configured to be enough to store all the data values of the artificial neural network model 1300.

The cache memory according to the exemplary embodiments is not limited to the SRAM. Examples of the static memories which are capable of performing a high speed operation like the SRAM include SRAM, MRAM, STT-MRAM, eMRAM, OST-MRAM, and the like. Moreover, MRAM, STT-MRAM, eMRAM, and OST-MRAM are static memories having a non-volatile characteristic. Accordingly, when the power of the artificial neural network memory system 300 is shut off and then rebooted, the artificial neural network model 1300 does not need to be provided from the memory 330 again, but the exemplary embodiments according to the present disclosure are not limited thereto.

According to the above-described configuration, when the artificial neural network memory system 300 performs the inference operation of the artificial neural network model 1300 based on the artificial neural network data locality pattern 1400, the power consumption due to the reading operation of the memory 330 may be significantly reduced.

Figure 14:
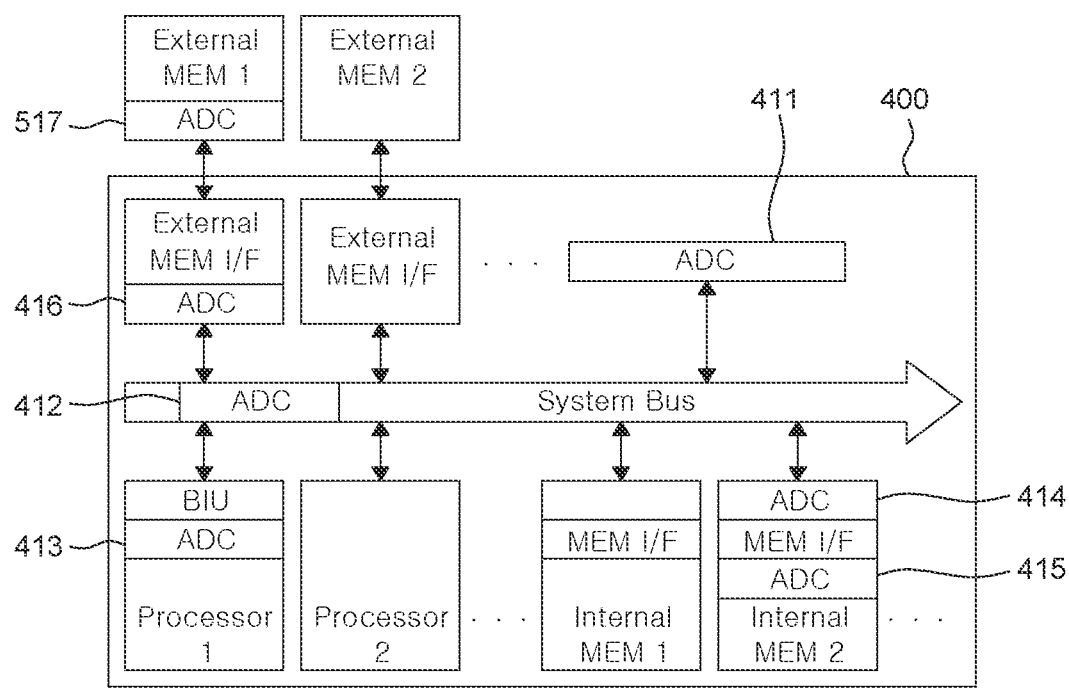
FIG. 14 is a schematic diagram for explaining an artificial neural network memory system according to various exemplary embodiments of the present disclosure.

FIG. 14 is a schematic diagram for explaining an artificial neural network memory system according to various exemplary embodiments of the present disclosure.

Hereinafter, various exemplary embodiments according to the present disclosure will be described with reference to FIG. 14. FIG. 14 may explain the number of various cases in which various exemplary embodiments according to the present disclosure may be carried out.

According to various exemplary embodiments of the present disclosure, an artificial neural network memory system 400 includes at least one processor, at least one memory, and at least one artificial neural network memory controller ADC configured to include at least one processor and receive a data access request from at least one processor to provide the memory access request to at least one memory. The at least one artificial neural network memory controller ADC may be configured to be substantially the same as the exemplary artificial neural network memory controllers 120, 220, and 320. However, it is not limited thereto, and one artificial neural network memory controller of the artificial neural network memory system 400 may be configured to be different from the other artificial neural network memory controllers. Hereinafter, the repeated description of the artificial neural network memory controllers 411, 412, 413, 414, 415, 416, and 517 and the above-described artificial neural network memory controllers 120, 220, and 320 of the artificial neural network memory system will be omitted for the convenience of description.

The at least one artificial neural network memory controller is configured to connect at least one processor and at least one memory. At this time, in a data transferring path between at least one processor and at least one memory, there may be a corresponding artificial neural network data locality. Accordingly, the artificial neural network memory controller located in the data transferring path may be configured to extract the corresponding artificial neural network data locality pattern.

Each artificial neural network memory controller ADC may be configured to monitor each data access request to generate an artificial neural network data locality pattern. The artificial neural network memory system 400 may be configured to include at least one processor. The at least one processor may be configured to process the artificial neural network operation alone or in cooperation with other processors.

The artificial neural network memory system 400 may be configured to include at least one internal memory. The artificial neural network memory system 400 may be configured to be connected to at least one external memory. The internal memory or the external memory may include a dynamic RAM (DRAM), a high bandwidth memory (HBM), a static RAM (SRAM), a programmable ROM (PROM), an erasable PROM (EPROM), an electrically erasable PROM (EEPROM), a flash memory, a ferroelectric RAM (FRAM), a flash memory, a magnetic RAM (MRAM), a hard disk, a phase change memory device (phase change RAM), and the like, but the present disclosure is not limited thereto.

External memory (External MEM 1, External MEM 2) or internal memory (Internal MEM1, Internal MEM2) can communicate with the artificial neural network memory system 400 via corresponding memory interface (External MEM I/F).

A processor (Processor 1) can include bus interface unit (BIU) communicating with a system bus.

The artificial neural network memory system 400 may include an external memory interface connected to the external memory (External MEM). The external memory interface transmits the memory access request to at least one external memory of the artificial neural network memory system 400 and may receive data in response to the memory access request from the at least one external memory. The configurations and functions disclosed in the exemplary artificial neural network memory controllers 120, 220, and 320 are distributed to a plurality of artificial neural network memory controllers 411, 412, 413, 414, 415, 416, and 517 to be disposed in a specific position of the artificial neural network memory system 400. In some exemplary embodiments, the processor may be configured to include an artificial neural network memory controller.

In some exemplary embodiments, the memory may be a DRAM and, in this case, the artificial neural network memory controller may be configured to be included in the DRAM.

For example, at least one of the artificial neural network memory controllers 411, 412, 413, 414, 415, 416, and 517 may be configured to include a cache memory. Further, the cache memory may be configured to be included in the processor, the internal memory and/or the external memory.

For example, at least one of the artificial neural network memory controllers 411, 412, 413, 414, 415, 416, and 517 may be configured to be distributed in the data transferring path between the memory and the processor.

For example, the artificial neural network memory controller which may be implemented in the artificial neural network memory system 400 may be configured by one of an independently configured artificial neural network memory controller 411, an artificial neural network memory controller 412 included in the system bus, an artificial neural network memory controller 413 configured as an interface of the processor, an artificial neural network memory controller 414 included in a wrapper block between the memory interface of the internal memory and the system bus, an artificial neural network memory controller included in the memory interface of the internal memory, an artificial neural network memory controller 415 included in the internal memory, an artificial neural network memory controller included in a memory interface corresponding to the external memory, an artificial neural network memory controller 416 included in the wrapper block between the memory interface of the external memory and the system bus and/or an artificial neural network memory controller 517 included in the external memory. However, the artificial neural network memory controller according to the exemplary embodiments of the present disclosure is not limited thereto.

For example, individual artificial neural network data locality patterns generated by the first artificial neural network memory controller 411 and the second artificial neural network memory controller 412 may be the same or may be different from each other.

In other words, the first artificial neural network memory controller 411 may be configured to connect a first processor Processor1 and a first internal memory internal MEM1 by means of the system bus. At this time, in the data transferring path between the first processor Processor1 and the first internal memory internal MEM1, there may be a first artificial neural network data locality.

In such case, the third artificial neural network memory controller 413 is illustrated in said path. However, it is merely illustrative and the third artificial neural network memory controller 413 may be omitted. That is, when at least one artificial neural network memory controller is disposed between the processor and the memory, the artificial neural network data locality pattern of the artificial neural network model which is processed by the processor may be generated.

In other words, the second artificial neural network memory controller 412 may be configured to connect a second processor (Processor 2) and a first external memory external MEM1. At this time, in the data transferring path between the second processor (Processor 2) and the first external memory external MEM1, there may be a second artificial neural network data locality.

For example, a first artificial neural network model which is processed by the first processor (Processor 1) may be an object recognition model and a second artificial neural network model which is processed by the second processor (Processor 2) may be a voice recognition model. Accordingly, the artificial neural network models may be different from each other, and corresponding artificial neural network data locality patterns may also be different from each other.

That is, the artificial neural network data locality patterns generated by the artificial neural network memory controllers 411, 412, 413, 414, 415, 416, and 517 may be determined in accordance with a pattern characteristic of the data access request generated by the corresponding processor.

That is, even though the artificial neural network memory controller of the artificial neural network memory system 400 is disposed between an arbitrary processor and an arbitrary memory, the artificial neural network memory controller may provide adaptability to generate the artificial neural network data locality pattern in the corresponding position. In other words, when two processors cooperate to process one artificial neural network model in parallel, the artificial neural network data locality pattern of the artificial neural network model may be divided to be assigned to each processor. For example, a convolution operation of a first layer is processed by a first processor and a convolution operation of a second layer is processed by a second processor to distribute the operation of the artificial neural network model. In this case, even though the artificial neural network model is the same, the artificial neural network data locality of the artificial neural network model processed by the respective processors may be reconstructed in the unit of the data access request. In this case, each artificial neural network memory controller may provide adaptability to generate an artificial neural network data locality pattern corresponding to the data access request of the processor which is processed by the artificial neural network memory controller.

According to the above-described configuration, even though the plurality of artificial neural network memory controllers is distributed between a plurality of processors and a plurality of memories, the performance of the artificial neural network memory system 400 may be optimized by the artificial neural network data locality patterns generated to be suitable for each situation. That is, each artificial neural network memory controller analyzes the artificial neural network data locality in its position to be optimized for the artificial neural network operation which is variably processed in real time.

In some exemplary embodiments, at least one of the artificial neural network memory controllers 411, 412, 413, 414, 415, 416, and 517 may be configured to confirm at least one information of the number of memories, a memory type, an effective bandwidth of a memory, a latency of a memory, and a memory size.

In some exemplary embodiments, at least one of the artificial neural network memory controllers 411, 412, 413, 414, 415, 416, and 517 may be configured to measure an effective bandwidth of a memory which responds to the memory access request. Here, the memory may be at least one memory and each artificial neural network memory controller may measure an effective bandwidth of a channel which communicates with each memory. The effective bandwidth may be calculated by measuring a time that the artificial neural network memory controller generates a memory access request and the memory access request ends and a data transfer bit rate.

In some exemplary embodiments, at least one of the artificial neural network memory controllers 411, 412, 413, 414, 415, 416, and 517 may be configured to be provided with a necessary bandwidth of at least one memory which responds to the memory access request.

In some exemplary embodiments, the artificial neural network memory system 400 includes a plurality of memories and at least one artificial neural network memory controller may be configured to measure effective bandwidths of the plurality of memories.

In some exemplary embodiments, the artificial neural network memory system 400 includes a plurality of memories and at least one artificial neural network memory controller may be configured to measure the latencies of the plurality of memories.

That is, at least one artificial neural network memory controller may be configured to perform auto-calibration of memories connected thereto. The auto-calibration may be configured to be executed when the artificial neural network memory system starts or at a specific cycle. At least one artificial neural network memory controller may be configured to collect information such as the number of memories connected thereto, a type of the memory, an effective bandwidth of the memory, a latency of the memory, and a size of the memory, by means of the auto-calibration.

According to the above-described configuration, the artificial neural network memory system 400 may know the latency and the effective bandwidth of the memory corresponding to the artificial neural network memory controller.

According to the above-described configuration, even though an independent artificial neural network memory controller is connected to the system bus, an artificial neural network data locality of an artificial neural network model which is being processed by the processor is generated to control the memory.

In some exemplary embodiments, at least one artificial neural network memory controller of the artificial neural network memory system 400 may be configured to calculate a time taken to repeat the artificial neural network data locality pattern one time and a data size to calculate an effective bandwidth required for the artificial neural network operation. Specifically, when all the data access requests included in the artificial neural network data locality pattern are processed, it is determined that the processor completes the inference of the artificial neural network model. The artificial neural network memory system 400 may be configured to measure a time taken to one inference based on the artificial neural network data locality pattern to calculate the number of inferences per second (IPS: inference per second). Further, the artificial neural network memory system 400 may be provided with target inference number per second information from the processor. For example, a specific application requires 30 IPS as the inference rate of a specific artificial neural network model. If the measured IPS is lower than a target IPS, the artificial neural network memory controller 400 may be configured to operate to improve the artificial neural network model processing speed of the processor.

In some exemplary embodiments, the artificial neural network memory system 400 may be configured to include a system bus configured to control communication of an artificial neural network memory controller, a processor, and a memory. Further, at least one artificial neural network memory controller may be configured to have a master authority of the system bus.

In other words, the artificial neural network memory system 400 may not be a dedicated device for the artificial neural network operation. In this case, various peripheral devices such as wifi devices, displays, cameras, or microphones may be connected to the system bus of the artificial neural network memory system 400. In this case, the artificial neural network memory system 400 may be configured to control the bandwidth of the system bus for stable artificial neural network operation.

In some exemplary embodiments, at least one artificial neural network memory controller may operate to preferentially process the artificial neural network operation for the processing time of the memory access request and process operations other than the artificial neural network operation for the other time.

In some exemplary embodiments, at least one artificial neural network memory controller may be configured to ensure an effective bandwidth of the system bus until at least one memory completes a memory access request.

In some exemplary embodiments, at least one artificial neural network memory controller is disposed in the system bus and the system bus may be configured to dynamically change the bandwidth of the system bus based on the artificial neural network data locality pattern generated in the system bus.

In some exemplary embodiments, at least one artificial neural network memory controller is disposed in the system bus and at least one artificial neural network memory controller may be configured to increase the control authority of the system bus to be higher than that when there is no memory access request, until at least one memory completes the response for the memory access request.

In some exemplary embodiments, at least one artificial neural network memory controller may be configured to set a priority of a data access request of a processor which processes an artificial neural network operation, among a plurality of processors, to be higher than that of a processor which processes an operation other than the artificial neural network operation.

In some exemplary embodiments, the artificial neural network memory controller may be configured to directly control the memory.

In some exemplary embodiments, the artificial neural network memory controller is included in the memory and the artificial neural network memory controller may be configured to generate at least one access que. The artificial neural network memory controller may be configured to separately generate an access que dedicated for the artificial neural network operation.

In some exemplary embodiments, at least one of the plurality of memories may be a DRAM. In this case, at least one artificial neural network memory controller may be configured to readjust the access que of the memory access requests. The access que readjustment may be an access que re-order.

In some exemplary embodiments, the artificial neural network memory controller may be configured to include an access que of a plurality of memory access requests. In this case, the first access que may be an access que dedicated to the artificial neural network operation and the second access que may be an access que for operations other than the artificial neural network operation. The artificial neural network memory controller may be configured to provide data by selecting each access que in accordance with the priority setting.

In some exemplary embodiments, at least one artificial neural network memory controller may be configured to calculate a specific bandwidth required for the system bus to process a specific memory access request based on the artificial neural network data locality pattern, and at least one artificial neural network memory controller may be configured to control the effective bandwidth of the system bus based on the specific bandwidth.

According to the above-described configuration, the artificial neural network memory system 400 may be configured to lower the priority of the memory access requests of various peripheral devices or raise a priority of an advance data access request based on the artificial neural network data locality pattern.

According to the above-described configuration, the artificial neural network memory controller readjusts the processing order of the data access request of the system bus to fully utilize the bandwidth of the system bus while the artificial neural network operation is processed and to yield the bandwidth for processing data of other peripheral devices when there is no artificial neural network operation.

According to the above-described configuration, the artificial neural network memory controller may readjust the processing sequence of the data access request based on the artificial neural network data locality pattern. Further, the artificial neural network memory controller readjusts the priority based on identification information included in the data access request. That is, from the viewpoint of the artificial neural network operation, the effective bandwidth of the system bus dynamically varies so that the effective bandwidth may be improved. Accordingly, an operation efficiency of the system bus may be improved. Accordingly, the effective bandwidth of the system bus may be improved from the viewpoint of the artificial neural network memory controller.

In some exemplary embodiments, at least one artificial neural network memory controller may be configured to perform machine learning of the data access request. That is, at least one artificial neural network memory controller may further include an artificial neural network model which is configured to machine-learn the artificial neural network data locality pattern. That is, the artificial neural network data locality pattern is machine-learned so that specific patterns, that another data access request is interrupted in the middle of the data access request processing according to the actual artificial neural network data locality, are learned in order to be predicted.

When an advance data access request is generated, the artificial neural network model embedded in the artificial neural network memory controller may be machine-trained to increase the control authority of the system bus to be higher than when the advance data access requests are not generated.

In some exemplary embodiments, at least one artificial neural network memory controller further includes a plurality of layered cache memories and at least one artificial neural network memory controller may be configured to perform machine-learning of data access requests between layers of the plurality of layered cache memories.

In some exemplary embodiments, at least one artificial neural network memory controller may be configured to be provided with at least one of an effective bandwidth, a power consumption, and latency information of each layer of the plurality of layered cache memories.

According to the above-described configuration, the artificial neural network memory controller may be configured to generate an artificial neural network data locality pattern by means of the machine learning and the machine-learned artificial neural network data locality pattern may improve a probability of predicting a specific pattern occurrence when various data access requests regardless of the artificial neural network operation are generated with the specific pattern. Further, characteristics of various artificial neural network models and other operations processed by the processor are predicted by the reinforcement learning to improve the efficiency of the artificial neural network operation.

In some exemplary embodiments, at least one artificial neural network memory controller may be configured to divide and store data to be stored in the plurality of memories based on the effective bandwidth and the latency of each of the plurality of memories.

For example, data is configured by L bits of bit groups and a plurality of memories includes a first memory and a second memory. The first memory is configured to divide and store M bits of data from the L bits of bit groups based on a first effective bandwidth or a first latency and the second memory is configured to divide and store N bits of data from the L bits of bit groups based on a second effective bandwidth or a second latency. The sum of M bits and N bits may be configured to be smaller than or equal to the L bits. Further, the plurality of memories further includes a third memory and the third memory is configured to store O bits of data from the L bits of bit groups based on a third effective bandwidth or a third latency, and the sum of the M bits, N bits, and O bits may be configured to be equal to the L bits.

For example, the data is configured by P data packets and a plurality of memories includes a first memory and a second memory. The first memory is configured to store R data packets among P data packets based a first effective bandwidth or a first latency and the second memory is configured to store S data packets among P data packets based a second effective bandwidth or a second latency. The sum of R and S may be configured to be smaller than or equal to P. In addition, the plurality of memories further includes a third memory and the third memory is configured to store T data packets from the P data packets based on a third effective bandwidth or a third latency, and the sum of R, S, and T may be configured to be equal to P.

According to the above-described configuration, when a bandwidth of one memory is low, the artificial neural network memory controller may distribute the data to be stored or read, so that the effective bandwidth of the memory may be improved. For example, the artificial neural network memory controller may be configured to divide 8 bits of quantized weight value to store or read 4 bits in the first memory and 4 bits in the second memory. Accordingly, the effective bandwidth of the memory may be improved from the viewpoint of the artificial neural network memory controller.

The artificial neural network memory controller may be configured to further include a cache memory which is configured to merge and store data which is divided to be stored in the plurality of memories. That is, at least one artificial neural network memory controller further includes a cache memory and may be configured to merge data distributed to be stored in the plurality of memories to store the merged data in the cache memory. Accordingly, the processor may be provided with the merged data.

In order to merge the divided data, at least one artificial neural network memory controller may be configured to store division information of the data which is divided to be stored in the plurality of memories. Various exemplary embodiments of the present disclosure will be described as follows.

According to one exemplary embodiment of the present disclosure, the artificial neural network memory system may be configured to include at least one processor configured to generate a data access request corresponding to the artificial neural network operation and at least one artificial neural network memory controller configured to generate an artificial neural network data locality pattern of an artificial neural network operation by sequentially recording the data access request and to generate an advance data access request which predicts a next data access request of the data access request generated by at least one processor based on the artificial neural network data locality pattern. Here, the artificial neural network data locality is an artificial neural network data locality which is reconstructed at a processor-memory level.

According to the exemplary embodiments of the present disclosure, the artificial neural network memory system may be configured to include at least one processor configured to process the artificial neural network model and at least one artificial neural network memory controller configured to store artificial neural network data locality information of an artificial neural network model and to predict data to be requested by at least one processor based on the artificial neural network data locality information to generate an advance data access request.

The artificial neural network memory system may be configured to further include at least one memory and a system bus configured to control communication of the artificial neural network memory controller, at least one processor, and at least one memory. According to the exemplary embodiment of the present disclosure, the artificial neural network memory system includes a processor, a memory, and a cache memory and is configured to generate an advance data access request including data to be requested by the processor based on the artificial neural network data locality information and store data corresponding to the advance data access request from the memory in the cache memory before the processor requests.

According to the exemplary embodiment of the present disclosure, the artificial neural network memory system may be configured to operate in either one of a first mode configured to operate by receiving the artificial neural network data locality information and a second mode configured to operate by observing data access requests generated by the processor to predict the artificial neural network data locality information.

At least one artificial neural network memory controller may be configured to sequentially further generate an advance data access request based on the artificial neural network data locality pattern.

At least one artificial neural network memory controller may be configured to generate an advance data access request before generating a next data access request.

At least one processor may be configured to transmit a data access request to at least one artificial neural network memory controller.

At least one artificial neural network memory controller may be configured to output an advance data access request in response to a data access request.

The data access request may be configured to further include a memory address.

The data access request may be configured to further include a start address and an end address of the memory.

At least one artificial neural network memory controller may be configured to generate a memory access request based on one of the data access request generated by at least one processor and the advance data access request generated by the artificial neural network memory controller.

The data access request may be configured to further include a start address of the memory and a continuous data read trigger.

The data access request may be configured to further include a start address of the memory and information of the number of continuous data.

The data access request and the advance data access request may be configured to further include a data access request token of the same matching memory address.

The data access request may be configured to further include identification information to identify whether it is a memory read command or a write command.

The data access request may be configured to further include identification information to identify whether it is a memory overwrite command.

The data access request may be configured to further include identification information to identify whether it is inference data, weight data, or feature map data.

The data access request may be configured to further include identification information to identify whether it is learning data or evaluation data.

The data access request may be configured to further include identification information to identify whether the artificial neural network operation is an operation for learning or an operation for inference.

When at least one processor generates a next data access request, at least one artificial neural network memory controller may be configured to determine whether an advance data access request and a next data access request are the same requests.

When the advance data access request and the next data access request are the same requests, at least one artificial neural network memory controller may be configured to maintain the artificial neural network data locality pattern.

When the advance data access request and the next data access request are different, at least one artificial neural network memory controller may be configured to update the artificial neural network data locality pattern.

The artificial neural network data locality pattern may be configured to further include data in which addresses of the memory of the data access requests are sequentially recorded.

At least one artificial neural network memory controller may be configured to generate the artificial neural network data locality pattern by detecting the repeated pattern of the memory address included in the data access request.

The artificial neural network data locality pattern may be configured by memory addresses having a repeated loop characteristic.

The artificial neural network data locality pattern may be configured to further include identification information for identifying the start and the end of the operation of the artificial neural network model.

At least one processor may be configured to be provided with data corresponding to the data access request from the artificial neural network memory controller.

At least one artificial neural network memory controller may be configured to further include an artificial neural network model which is configured to machine-learn the artificial neural network data locality pattern.

At least one artificial neural network memory controller may be configured to store an updated pattern and an advance pattern of the artificial neural network data locality pattern to determine whether the artificial neural network model is changed.

At least one artificial neural network memory controller may be configured to determine whether the data access requests are requests of one artificial neural network model or are mixtures of the requests of the plurality of artificial neural network models.

When there is a plurality of artificial neural network models, at least one artificial neural network memory controller may be configured to further generate artificial neural network data locality patterns corresponding to the number of artificial neural network models.

At least one artificial neural network memory controller may be configured to individually generate corresponding advance data access requests based on the artificial neural network data locality patterns.

At least one artificial neural network memory controller may be configured to further generate a data access request corresponding to the data access request.

At least one artificial neural network memory controller may be configured to further generate a data access request corresponding to the advance data access request.

Each of the data access request, the advance data access request, and the memory access request may be configured to include the corresponding memory address value and operation mode.

At least one artificial neural network memory controller may be configured to further generate a memory access request including at least a part of information included in the data access request and the advance data access request.

At least one memory configured to communicate with at least one artificial neural network memory controller is further included, and at least one memory may be configured to operate in response to the memory access request output from at least one artificial neural network memory controller.

At least one memory may be configured to store at least one of inference data, weight data, and feature map data.

At least one neural network artificial neural network memory controller may be configured to further include a cache memory configured to store data transmitted from at least one memory in response to the memory access request.

When at least one processor outputs a next data access request, at least one artificial neural network memory controller determines whether the advance data access request and the next data access request are the same requests. If the advance data access request and the next data access request are the same, at least one artificial neural network memory controller may be configured to provide data stored in the cache memory to at least one processor and if the advance data access request and the next data access request are not the same, at least one artificial neural network memory controller may be configured to generate a new memory access request based on the next data access request.

At least one artificial neural network memory controller sequentially generates at least one memory access request based on a remaining capacity of the cache memory to minimize the remaining capacity of the cache memory.

At least one artificial neural network memory controller may be configured to measure an effective bandwidth of at least one memory which responds to the memory access request.

At least one artificial neural network memory controller may be configured to be provided with a necessary bandwidth of at least one memory which responds to the memory access request.

At least one artificial neural network memory controller may be configured to measure the number of inferences per second (IPS) of the artificial neural network operation by calculating the number of repeating times of the artificial neural network data locality patterns for a specific time.

At least one artificial neural network memory controller may be configured to calculate a time taken to repeat the artificial neural network data locality pattern one time and a data size to calculate an effective bandwidth required for the artificial neural network operation.

At least one memory further includes a DRAM including a refresh function to update a voltage of a memory cell and at least one artificial neural network memory controller may be configured to selectively control the refresh of a memory address area of at least one memory corresponding to the memory access request corresponding to the advance data access request.

At least one memory further includes a precharge function to charge a global bit line of the memory with a specific voltage and at least one artificial neural network memory controller may be configured to selectively provide precharge to a memory address area of at least one memory corresponding to the memory access request corresponding to the advance data access request.

At least one memory further includes a plurality of memories and at least one artificial neural network memory controller may be configured to measure effective bandwidths of the plurality of memories, respectively.

At least one memory further includes a plurality of memories and at least one artificial neural network memory controller may be configured to measure latencies of the plurality of memories, respectively.

At least one memory further includes a plurality of memories and at least one artificial neural network memory controller may be configured to divide and store data to be stored in the plurality of memories based on the effective bandwidth and the latency of each of the plurality of memories.

Data is configured by L bits of bit groups and a plurality of memories further includes a first memory and a second memory. The first memory is configured to divide and store M bits of data from the L bits of bit groups based on a first effective bandwidth or a first latency and the second memory is configured to divide and store N bits of data from the L bits of bit groups based on a second effective bandwidth or a second latency. The sum of M bits and N bits may be configured to be smaller than or equal to the L bits.

The plurality of memories further includes a third memory and the third memory is configured to store O bits of data from the L bits of bit groups based on a third effective bandwidth or a third latency, and the sum of the M bits, N bits, and O bits may be configured to be equal to the L bits.

At least one artificial neural network memory controller may be configured to further include a cache memory which is configured to merge and store data which is divided to be stored in the plurality of memories.

Data is configured by P data packets, and a plurality of memories includes a further first memory and a second memory. The first memory is configured to store R data packets among P data packets based a first effective bandwidth or a first latency and the second memory is configured to store S data packets among P data packets based a second effective bandwidth or a second latency. The sum of R and S may be configured to be smaller than or equal to P.

The plurality of memories further includes a third memory and the third memory is configured to store T data packets from the P data packets based on a third effective bandwidth or a third latency, and the sum of R, S, and T may be configured to be equal to P.

At least one memory further includes a plurality of memories, and at least one artificial neural network memory controller further includes a cache memory and is configured to merge data distributed to be stored in the plurality of memories to store the merged data in the cache memory.

At least one memory further includes a plurality of memories, and at least one artificial neural network memory controller may be configured to store divided information of the data which is divided to be stored in the plurality of memories.

At least one artificial neural network memory controller may be configured to store a part of the data in the cache memory as much as the latency, based on the advance data access request and the latency value of at least one memory.

At least one artificial neural network memory controller may be configured to store a part of the data in the cache memory based on the advance data access request and a required data bandwidth of at least one memory.

When at least one processor generates a next data access request, at least one artificial neural network memory controller provides data stored in cache memory first and controls the remaining data in a read-burst mode, from at least one memory, to reduce the latency of at least one memory.

When at least one processor generates a next data access request based on the advance data access request and the latency value of at least one memory, at least one artificial neural network memory controller starts with a read-burst mode of at least one memory in advance by as much as the latency value, to reduce the latency of at least one memory.

A system bus configured to control communication of the artificial neural network memory controller, at least one processor, and at least one memory may be further included.

At least one artificial neural network memory controller may be configured to have a master authority of the system bus.

At least one artificial neural network memory controller further includes an artificial neural network model and, when an advance data access request is generated, the artificial neural network model may be machine-trained to increase the control authority of the system bus to be higher than when the advance data access requests are not generated.

At least one artificial neural network memory controller may be configured to ensure an effective bandwidth of the system bus until at least one memory completes a memory access request.

At least one artificial neural network memory controller may be configured to calculate a specific bandwidth required for the system bus to process a specific memory access request based on the artificial neural network data locality pattern and at least one artificial neural network memory controller may be configured to control the effective bandwidth of the system bus based on the specific bandwidth.

At least one artificial neural network memory controller is disposed in the system bus, and the system bus is configured to dynamically change the bandwidth of the system bus based on the artificial neural network data locality pattern generated in the system bus.

At least one artificial neural network memory controller may operate to preferentially process the artificial neural network operation for the processing time of the memory access request and to process operations other than the artificial neural network operation for the other time.

At least one artificial neural network memory controller and at least one processor may be configured to directly communicate with each other.

The artificial neural network memory controller may be configured to further include a first access que which is an access que dedicated to the artificial neural network operation, and a second access que which is an access que other than the artificial neural network operation and the artificial neural network memory controller may be configured to select the access que in accordance with the priority setting to provide data.

At least one artificial neural network memory controller further includes a plurality of layered cache memories and at least one artificial neural network memory controller may be configured to further include an artificial neural network model which is configured to perform machine-learning of data access requests between layers of the plurality of layered cache memories.

At least one artificial neural network memory controller may be configured to be further provided with at least one of an effective bandwidth, a power consumption, and latency information of each layer of the plurality of layered cache memories.

At least one processor configured to generate a data access request corresponding to the artificial neural network operation, at least one artificial neural network memory controller configured to store an artificial neural network data locality pattern of an artificial neural network operation generated from a compiler and generate an advance data access request which predicts a next data access request of the data access request generated by at least one processor based on the artificial neural network data locality pattern, and at least one memory configured to communicate with at least one artificial neural network memory controller are included. At least one memory may be configured to operate in accordance with the memory access request output from at least one artificial neural network memory controller.

At least one artificial neural network memory system may be configured to further include at least one memory and a system bus configured to control communication of an artificial neural network memory controller, at least one processor, and at least one memory.

At least one artificial neural network memory controller is disposed in the system bus, and at least one artificial neural network memory controller may be configured to increase the control authority of the system bus to be higher than that when there is no memory access request, until at least one memory completes the response for the memory access request.

The at least one artificial neural network memory controller includes one or more artificial neural network memory controllers that are configured to be included in the DRAM.

The at least one artificial neural network memory controller includes one or more artificial neural network memory controllers that are configured to be included in at least one processor.

At least one memory further includes a DRAM or at least one memory is DRAM and at least one artificial neural network memory controller may be configured to readjust an access que of the memory access request. That is, at least one artificial neural network memory controller may be configured to control a reorder cue of the memory controller of the DRAM.

An artificial neural network operation-related memory access request provided from the artificial neural network memory controller to the memory controller of the memory may further include priority information which can be interpreted by the memory controller of the memory.

According to the above-described configuration, the memory controller of the memory may be configured to reorder the memory access que in the memory controller based on the priority information included in the memory access request generated by the artificial neural network memory controller regardless of whether the memory access request is related to the artificial neural network operation. Accordingly, the access que of the memory access request for processing the artificial neural network operation may be processed earlier than the access que of another type of memory access request. Accordingly, the artificial neural network memory controller may increase the effective bandwidth of the corresponding memory.

The memory access request processing order determined by the memory controller of the DRAM may be readjusted by the priority information provided by the artificial neural network memory controller.

For example, when the priority of the memory access request generated by the artificial neural network memory controller is set to be urgent, the memory controller of the DRAM may change the processing sequence of the memory access request to a first priority.

The artificial neural network memory controller may be configured to generate at least one access que.

At least one memory includes an artificial neural network memory controller, and the artificial neural network memory controller may be configured to separately generate the access que dedicated to the artificial neural network operation.

At least one artificial neural network memory controller may be configured to readjust the access que of the memory access requests.

At least one memory further includes a read-burst function, and at least one artificial neural network memory controller may be configured to set the storage area of at least one memory in consideration of the read-burst function.

At least one memory further includes a read-burst function, and at least one artificial neural network memory controller may be configured to process the write operation in the storage area of at least one memory in consideration of the read-burst function.

At least one processor further includes a plurality of processors, and at least one artificial neural network memory controller may be configured to set a priority of a data access request of a processor which processes an artificial neural network operation, among a plurality of processors, to be higher than that of a processor which processes an operation other than the artificial neural network operation.

The features, structures, effects and the like described in the foregoing embodiments are included in one embodiment of the present disclosure and are not necessarily limited to one embodiment. Moreover, the features, structures, effects and the like illustrated in each embodiment may be combined or modified by those skilled in the art for the other embodiments to be carried out. Therefore, the combination and the modification of the present disclosure are interpreted to be included within the scope of the present disclosure.

In the above description, the present disclosure has been described based on the exemplary embodiment, but the exemplary embodiments are for illustrative, and do not limit the present invention, and those skilled in the art will appreciate that various modifications and applications, which are not exemplified in the above description, may be made without departing from the scope of the essential characteristic of the present exemplary embodiments. For example, each constituent element specifically present in the exemplary embodiment may be modified and carried out. Further, the differences related to the modification and the application should be construed as being included in the scope of the present invention defined in the accompanying claims.

[National R&D project supporting this invention]
[Project unique number] 1711117009
[Task number] 2020-0-01303-001
[Name of Ministry] Ministry of Science and Technology Information and Communication
[Name of project management (specialized) institution] Information and Communication Planning and Evaluation Institute
[Research project name] Next-generation intelligent semiconductor technology development (design) (R&D)
[Research project name] HBM3 level or higher interface technology development for high-performance AI server
[contribution rate] 1/1
[Name of project execution organization] DeepX Co., Ltd.
[Research Period] 2020.04.01~2020.12.31

What is claimed is:

1. An artificial neural network memory system, comprising:
    at least one processor configured to generate a data access request corresponding to an artificial neural network operation;
    at least one artificial neural network memory controller configured to
        sequentially record the data access request to generate an artificial neural network data locality pattern of the artificial neural network operation and
        generate an advance data access request which predicts a next data access request of the data access request generated by the at least one processor based on the artificial neural network data locality pattern;
    at least one memory; and
    a system bus configured to control communication of the artificial neural network memory controller, the at least one processor, and the at least one memory,
    wherein the at least one artificial neural network memory controller is disposed in the system bus, and
    wherein the at least one artificial neural network memory controller is configured to increase a control authority of the system bus to be higher than when there is no memory access request until the at least one memory completes a response for the memory access request.

2. The artificial neural network memory system of claim 1, wherein the at least one artificial neural network memory controller is further configured to sequentially generate the advance data access request based on the artificial neural network data locality pattern.

3. The artificial neural network memory system of claim 1, wherein the at least one artificial neural network memory controller is configured to generate the advance data access request before generating the next data access request.

4. The artificial neural network memory system of claim 1, wherein the data access request is configured to further include a start address of the memory and a continuous data read trigger.

5. The artificial neural network memory system of claim 1, wherein, when the at least one processor generates the next data access request, the at least one artificial neural network memory controller is configured to determine whether the advance data access request and the next data access request are the same requests.

6. The artificial neural network memory system of claim 1, wherein the artificial neural network data locality pattern is configured by memory addresses having a repeated loop characteristic.

7. The artificial neural network memory system of claim 1, wherein the at least one artificial neural network memory controller is configured to store an updated pattern and a previous pattern of the artificial neural network data locality pattern to determine whether an artificial neural network model is changed.

8. The artificial neural network memory system of claim 1, wherein the at least one artificial neural network memory controller is configured to determine whether the data access requests are requests of one artificial neural network model or are mixtures of the requests of a plurality of artificial neural network models.

9. The artificial neural network memory system of claim 1, wherein, when there are a plurality of artificial neural network models, the at least one artificial neural network memory controller is further configured to
    generate artificial neural network data locality patterns corresponding to the number of artificial neural network models and
    generate corresponding advance data access requests based on the artificial neural network data locality patterns.

10. The artificial neural network memory system of claim 1,
    wherein the at least one memory is configured to operate in response to a memory access request output from the at least one artificial neural network memory controller.

11. The artificial neural network memory system of claim 10, wherein the at least one artificial neural network memory controller is further configured to include a cache memory configured to store data transmitted from at least one memory in response to the memory access request.

12. The artificial neural network memory system of claim 11, wherein the at least one artificial neural network memory controller is configured to sequentially generate at least one of the memory access requests to minimize a remaining capacity of the cache memory based on the remaining capacity of the cache memory.

13. The artificial neural network memory system of claim 10, wherein the at least one artificial neural network memory controller is configured to measure an effective bandwidth of the at least one memory which responds the memory access request.

14. The artificial neural network memory system of claim 10,
wherein the at least one memory further includes a DRAM including a refresh function to update a voltage of a cell of the memory, and
wherein the at least one artificial neural network memory controller is configured to selectively control refresh of a memory address area of the at least one memory corresponding to the memory access request in response to the advance data access request.

15. The artificial neural network memory system of claim 10,
wherein the at least one memory further includes a precharge function to charge a global bit line of the memory with a specific voltage, and
wherein the at least one artificial neural network memory controller is configured to selectively provide precharge to a memory address area of the at least one memory corresponding to the memory access request corresponding to the advance data access request.

16. The artificial neural network memory system of claim 10,
wherein the at least one memory further includes a plurality of memories, and
wherein the at least one artificial neural network memory controller is configured to store divided information of the data which is divided to be stored in the plurality of memories.

17. The artificial neural network memory system of claim 1, wherein the at least one artificial neural network memory controller and the at least one processor are configured to directly communicate with each other.

18. The artificial neural network memory system of claim 10,
wherein the at least one artificial neural network memory controller further includes a plurality of layered cache memories, and
wherein the at least one artificial neural network memory controller is configured to further include an artificial neural network model which is configured to perform machine-learning of the data access requests between layers of the plurality of layered cache memories.

19. An artificial neural network memory system, comprising:
at least one processor configured to process an artificial neural network model;
at least one artificial neural network memory controller configured to
store artificial neural network data locality information of the artificial neural network model and
predict data to be requested by the at least one processor based on the artificial neural network data locality information to generate an advance data access request;
at least one memory; and
a system bus configured to control communication of the artificial neural network memory controller, the at least one processor, and the at least one memory,
wherein the at least one artificial neural network memory controller is disposed in the system bus, and
wherein the at least one artificial neural network memory controller is configured to increase a control authority of the system bus to be higher than when there is no memory access request until the at least one memory completes a response for the memory access request.

20. The artificial neural network memory system of claim 19, further comprising:
a DRAM,
wherein the at least one artificial neural network memory controller includes one or more artificial neural network memory controllers that are configured to be included in the DRAM.

21. The artificial neural network memory system of claim 19,
wherein the at least one artificial neural network memory controller includes one or more artificial neural network memory controllers that are configured to be included in the at least one processor.

22. The artificial neural network memory system of claim 19, further comprising:
a DRAM,
wherein the at least one artificial neural network memory controller is configured to readjust an access que of the memory access request.

23. The artificial neural network memory system of claim 19, further comprising:
at least one memory further including a read-burst function,
wherein the at least one artificial neural network memory controller is configured to set a storage area of the at least one memory in consideration of the read-burst function.

24. An artificial neural network memory system, comprising:
a processor,
a memory,
a memory controller configured to generate an advance data access request,
a system bus where the memory controller is disposed, and
a cache memory,
wherein the advance data access request including data to be requested by the processor is generated based on artificial neural network data locality information and data corresponding to the advance data access request from the memory is stored in the cache memory before a request of the processor, and
wherein the memory controller is configured to increase a control authority of the system bus to be higher than when there is no memory access request until the memory completes a response for the memory access request.

25. The artificial neural network memory system of claim 24, wherein the artificial neural network memory system is configured to operate in either one of
a first mode configured to operate by receiving the artificial neural network data locality information, and
a second mode configured to operate by observing the data access requests generated by the processor to predict the artificial neural network data locality information.

* * * * *